United States Patent
Ohno

(10) Patent No.: US 8,402,363 B2
(45) Date of Patent: Mar. 19, 2013

(54) TABLE EDITING APPARATUS AND METHOD THEREOF

(75) Inventor: Hajime Ohno, Fujisawa (JP)

(73) Assignee: Canon Kabushiki Kaisha (JP)

( * ) Notice: Subject to any disclaimer, the term of this patent is extended or adjusted under 35 U.S.C. 154(b) by 1194 days.

(21) Appl. No.: 11/836,208

(22) Filed: Aug. 9, 2007

(65) Prior Publication Data
US 2008/0052305 A1 Feb. 28, 2008

(30) Foreign Application Priority Data
Aug. 25, 2006 (JP) ................................. 2006-229853

(51) Int. Cl.
*G06F 17/00* (2006.01)
(52) U.S. Cl. ......... 715/227; 715/221; 715/223; 715/234
(58) Field of Classification Search .................. 715/221, 715/223, 227, 234
See application file for complete search history.

(56) References Cited

U.S. PATENT DOCUMENTS

| | | | | |
|---|---|---|---|---|
| 6,246,442 B1 * | 6/2001 | Harada et al. | ................. | 715/721 |
| 6,496,842 B1 * | 12/2002 | Lyness | ........................... | 715/206 |
| 7,373,591 B2 * | 5/2008 | Mory et al. | .................... | 715/205 |
| 7,454,436 B2 * | 11/2008 | Meijer et al. | .................... | 715/234 |
| 7,664,737 B2 * | 2/2010 | Brookler et al. | .............. | 715/265 |
| 2003/0005410 A1 * | 1/2003 | Harless | .......................... | 717/114 |
| 2005/0171966 A1 * | 8/2005 | Rath et al. | ..................... | 707/101 |
| 2006/0200739 A1 * | 9/2006 | Bhatia et al. | .................. | 715/500 |

FOREIGN PATENT DOCUMENTS

| | | |
|---|---|---|
| JP | 4337843 A | 11/1992 |
| JP | 05-134829 A | 6/1993 |
| JP | 11161480 A | 6/1996 |
| JP | 2002-183115 A | 6/2002 |
| JP | 2002222181 A | 8/2002 |
| JP | 2004326272 A | 11/2004 |
| JP | 2006506713 A | 2/2006 |
| JP | 2006103280 A | 4/2006 |

OTHER PUBLICATIONS

Office Action issued Aug. 1, 2011 for corresponding JP Patent Application No. 2006-229853.
"Making Life Easier with Filemaker!", PC Mode, vol. 11, No. 7, pp. 112-115, Mainichi Communications Inc., Japan.
Office Action Issued in Corresponding JP 2006-229853 dated Mar. 12, 2012.

* cited by examiner

*Primary Examiner* — Chau Nguyen
(74) *Attorney, Agent, or Firm* — Rossi, Kimms & McDowell LLP

(57) ABSTRACT

A form system 104 creates a table layout in accordance with an XML document that possesses a structure that is described by an XML schema. If a complex type of table element is present, the field name of the element is saved, and the child table elements of the complex type table element are laid out in the orientation of the height of the table. The field name and field region of each respective child table element is saved, and the position and size thereof determined. If a repeating loop element is present, an element is inserted beneath the table element in question that denotes the fact that the repeating loop is present. The layout data thus created is stored in the form storage unit 103.

24 Claims, 32 Drawing Sheets

301  <xsd:complexType name="ORDER">
302    <xsd:sequence>
303      <xsd:element name="DATE ORDER PLACED" type="xsd:date"/>
304      <xsd:element name="ORDER PLACED BY" type="xsd:string"/>
305      <xsd:element name="ITEM ORDERED, ITEM ORDERED" type="xsd:ITEM ORDERED, ITEM ORDERED" minOccurs="1" maxOccurs="9"/>
306      <xsd:element name="SHIP TO" type="xsd:address"/>
       </xsd:sequence>
     </xsd:complexType>

307  <xsd:complexType name="ITEM ORDERED">
308    <xsd:sequence>
309      <xsd:element name="PRODUCT NAME" type="xsd:string"/>
310      <xsd:element name="QUANTITY" type="xsd:positiveInteger"/>
311      <xsd:element name="UNIT PRICE" type="xsd:decimal"/>
       </xsd:sequence>
     </xsd:complexType>
```

F I G. 8
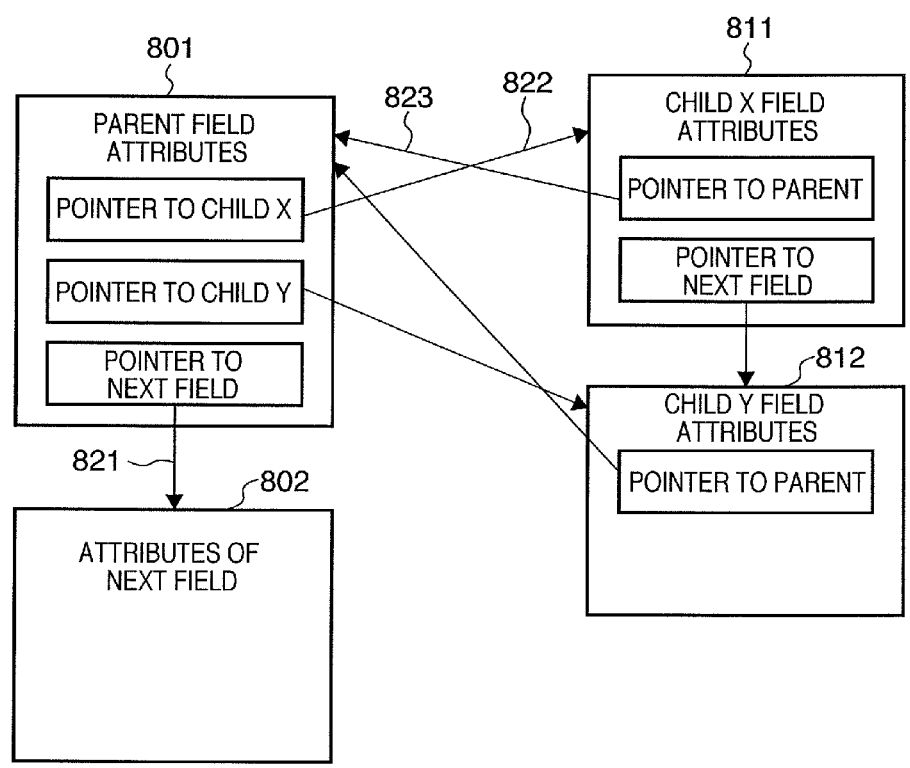

FIG. 13

| ORDER | DATE ORDERED | YYYY/MM/DD | | | |
|---|---|---|---|---|---|
| | ORDER PLACED BY | KKKKK | | | |
| | ITEM ORDERED | PRODUCT NAME | KKKKK | | |
| | | UNIT PRICE | | XXXXX | |
| | | QUANTITY | | XXXXX | |
| | SHIP TO | KKKKK | | | |

| ORDER | | | |
|---|---|---|---|
| | DATE ORDERED | YYYY/MM/DD | |
| | ORDER PLACED BY | KKKKK | |
| | ITEM ORDERED | PRODUCT NAME | KKKKK |
| | | UNIT PRICE | XXXXX |
| | | QUANTITY | XXXXX |
| | SHIP TO | KKKKK | |

1501 — table
1502 — additional rows

F I G. 16

1601

```
<ORDER>
    <DATE ORDERED>2006/3/3</DATE ORDERED>
    <ORDER PLACED BY>XXXX</ORDER PLACED BY>
    <ITEM ORDERED>
        <PRODUCT NAME>LABEL PRINTER</PRODUCT NAME>
        <QUANTITY>45000</QUANTITY>
        <UNIT PRICE>3</UNIT PRICE>
    </ITEM ORDERED>
    <ITEM ORDERED>
        <PRODUCT NAME>PAPER ROLL</PRODUCT NAME>
        <QUANTITY>500</QUANTITY>
        <UNIT PRICE>20</UNIT PRICE>
    </ITEM ORDERED>
    <SHIP TO>ABCDEF</SHIP TO>
</ORDER>
```

FIG. 17

| ORDER | DATE ORDERED | 2006/03/03 | | |
|---|---|---|---|---|
| | ORDER PLACED BY | XXXX | | |
| | ITEM ORDERED | PRODUCT NAME | LABEL PRINTER | |
| | | UNIT PRICE | | 45000 |
| | | QUANTITY | | 3 |
| | ITEM ORDERED | PRODUCT NAME | PAPER ROLL | |
| | | UNIT PRICE | | 500 |
| | | QUANTITY | | 20 |
| | SHIP TO | ABCDEF | | |

FIG. 18

| | | |
|---|---|---|
| ✓ | DISPLAY PARENT FIELD NAME | ~1801 |
| ✓ | DISPLAY CHILD FIELD NAME | ~1802 |
| ✓ | SET ARRANGEMENT ORIENTATION TO HORIZONTAL | ~1803 |
| | DISPLAY ALL ITEM NAMES | ~1804 |
| | ADD ROW SHOWING TOTALS | ~1805 |

FIG. 27

| ORDER | | | |
|---|---|---|---|
| DATE ORDERED | 2006/03/03 | | |
| ORDER PLACED BY | XXXX | | |
| ITEM ORDERED | PRODUCT NAME | LABEL PRINTER | |
| | UNIT PRICE | | 45000 |
| | QUANTITY | | 3 |
| | PRODUCT NAME | PAPER ROLL | |
| | UNIT PRICE | | 500 |
| | QUANTITY | | 20 |
| SHIP TO | ABCDEF | | |

TABLE EDITING APPARATUS AND METHOD THEREOF

BACKGROUND OF THE INVENTION

1. Field of the Invention

The present invention relates to a table editing method and an apparatus thereof, which are capable of performing editing of graphics while displaying the graphics on a screen.

2. Description of the Related Art

A form may be used for such objectives as a notification, making a request or a commission, or giving or obtaining consent or permission. The form is prepared by a recipient of information, and given to an issuer of the information. An item is positioned within the form that the recipient is to fill in, i.e., an input item. The recipient fills in the items on the form with items that are required for the purpose, and delivers the completed form to the recipient, in either a hardcopy or an electronic format. Upon receipt of the completed form, the recipient engages in processing in accordance with the objective of the form.

A software package, such as ForumManager from imageWARE® (iWFM), exists that implements a form system that employs such forms in an electronic fashion. Such a package is referred to as an electronic form system. Taking iWFM as an example, such an electronic form system is built from a plurality of components, on a per process step basis.

The step wherein the recipient prepares the form, for example, is handed by an editing component, which involves having a user use a keyboard and a mouse to draw the form in a fixed graphic on a computer screen, and edit a location or a format of an input item thereupon.

The step wherein the issuer fills out the form may be divided into three stages: a step of receiving the inputted information from the issuer, a step of compositing the completed form from the inputted information and the form, and outputting the completed form to a device, such as a display or a printer. An input analysis component handles the first step, a compositing component handles the second step, and an output control component deals with the last step.

XML, short for Extensible Markup Language, is used as a standard for marking up of form data that is handled by the electronic form system. XML is configured of data and an identifier, known as a tag. The data is delimited by the tag, and the software handles the tag that is used in the delimiting, as well as the data that is delimited thereby. A tag may have its meaning or configuration defined by the user. The definition of a text configuration that is marked with the XML tag is described with a schema description language, such as XML Schema, which is a language described in XML that is being promulgated as a W3C recommendation. The namespace of XML Schema is defined at <http://www.w3.org/2001/XMLschema>.

A significant advantage of XML is that it can be structured, which means, specifically, that properties such as the following are present:

The tags may be hierarchically nested;
A tag sequence may be defined:
A tag may be defined as either required or optional; and
A tag may be defined as to whether or not it repeatable, as well as a minimum or maximum number of iterations if it is repeatable.

Referring to a published XML schema when using XML to create a form allows a reduction in labor in the creation of the form. A software package exists that creates and edits a form by loading an XML schema, and displaying the tags defined in the XML schema thus loaded are displayed as a list in a graphical user interface (GUI) as components that may be positioned in the form. Refer to Japanese Patent Laid Open No. 05-134829, for example. Using a drag and drop mouse operation in the GUI, the user may position the tag that is displayed as the component into a desired placement in the form.

Given such conventional software for form creation and editing, the user has no need to know the XML schema that is used in the creation of the form. Nor does the user need to use a tag to create a form component. It is necessary, however, for the user to perform the involved work of laying out, i.e., designing the form, by selecting an appropriate component and positioning the component precisely in the form. It is necessary for the form to be designed to be positioned such that the input information is precisely categorized and organized, making the information comprehensible in order that the recipient is able to transition smoothly to successive processing upon receipt of the form. In many instances, the outputted form is reviewed by a human user, in addition to being processed electronically, and it can be difficult, if not impossible, to properly comprehend the content of the form if the positions of the items in the form are not precisely categorized and organized in the form. Designing a form with appropriately positioned items would also require the designer to exert no small amount of effort. The fact that the design is being done by human hands raises the specter of a form being created whose content cannot be easily comprehended, owing to the items therein not being appropriately positioned.

SUMMARY OF THE INVENTION

The present invention was created with the preceding conventional examples in mind, and has an object of improving productivity by reducing labor in layout of forms. Another object is to improve quality of forms.

The present invention possesses the following configuration in order to achieve the objects:

a structured data storage unit that stores a structured description data that describes a table's configuration based on a sequence and a hierarchy of each of a plurality of table elements;

a layout determination unit that determines the position and the size of each respective table element according to the sequence and the hierarchy of the plurality of table elements, in accordance with the structured description data; and a layout storage unit that stores the position and the size of each respective table element that is determined by the layout determination unit.

According to the present invention, it is possible to improve productivity by reducing labor in layout of forms. It is also possible to improve quality of forms.

Further features of the present invention will become apparent from the following description of exemplary embodiments, with reference to the attached drawings.

BRIEF DESCRIPTION OF THE DRAWINGS

FIG. 3 is a diagram of an XML schema of an order form system.

FIG. 8 depicts pointers linking parent fields with child fields.

FIG. 13 depicts a result of an automatic layout.

FIG. 15 depicts a result of the automatic field layout process that is performed when the repeated table element is present.

FIG. 16 depicts an XML schema that conforms to the XML schema of the order form system.

FIG. 17 is an automatic layout table wherein XML data of the order form system has been merged.

FIG. 18 is a menu that is displayed upon a right-click.

FIG. 27 is an example of a display that is invoked when a compiled display setting form overlay is in effect.

DESCRIPTION OF THE EMBODIMENTS

Following is a description of embodiments for carrying out the invention.

A System that Carries Out the Present Invention

Figure 1:
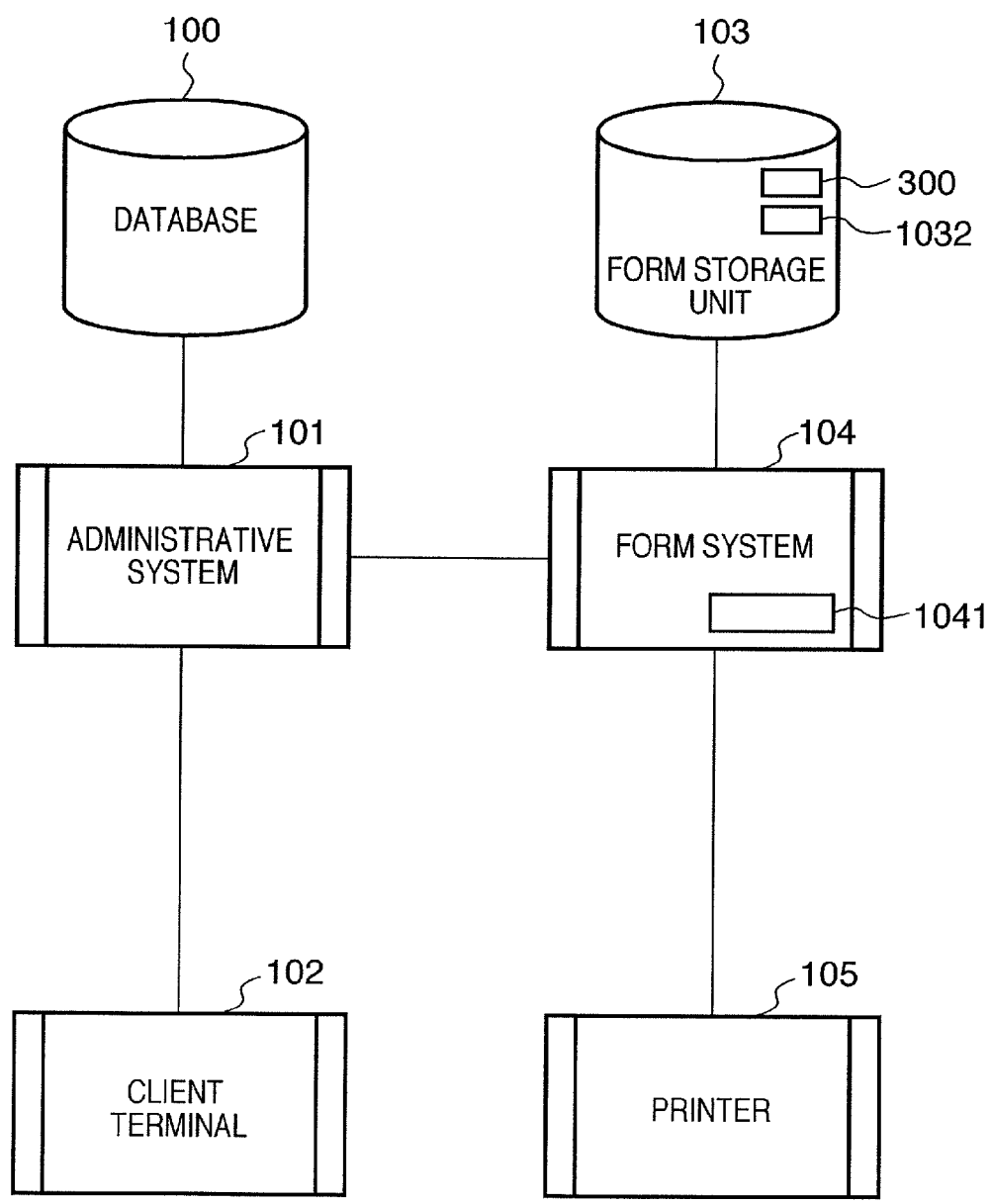
FIG. 1 is a block diagram of a typical administrative system that runs on an old-fashioned technology.

FIG. 1 is a configuration diagram of a computer system whereon runs an electronic form system, according to the present invention. Each respective block is configured by a standalone computer, except for a printer 105. It is presumed in the present circumstance that the computer system is an ordering system for a mail-order catalog company that deals in stationery products, for purposes of illustration. It would be permissible, however, for a form storage unit 103 to be a storage system that is connected to a computer in a form system 104. A database 100 stores data on products or customers. An administrative system 101 is the heart of the ordering system. It displays a catalog on a user's client terminal 102, and creates an order form when the user places an order, after first performing such operations as verifying inventory and processing for payment. The customer connects to the administrative system 101 over the Internet via the client terminal 102, and inputs the product order thereupon. The form storage unit 103 is a storage apparatus such as a hard drive, which stores all types of forms, one of which is the order form. The forms are described in XML. Upon receipt of the order data from the administrative system 101, the form system 104 downloads the form that corresponds to the order data, i.e., the order form, from the form storage unit 103. The form system 104 overlays the order data on the order form to generate the form data, which it sends to the printer 105. The printer 105 prints the form data that is sent thereto from the form system 104. The form system 104 is capable of performing editing of a pre-existing form, as well as creation of a new form.

Figure 2:
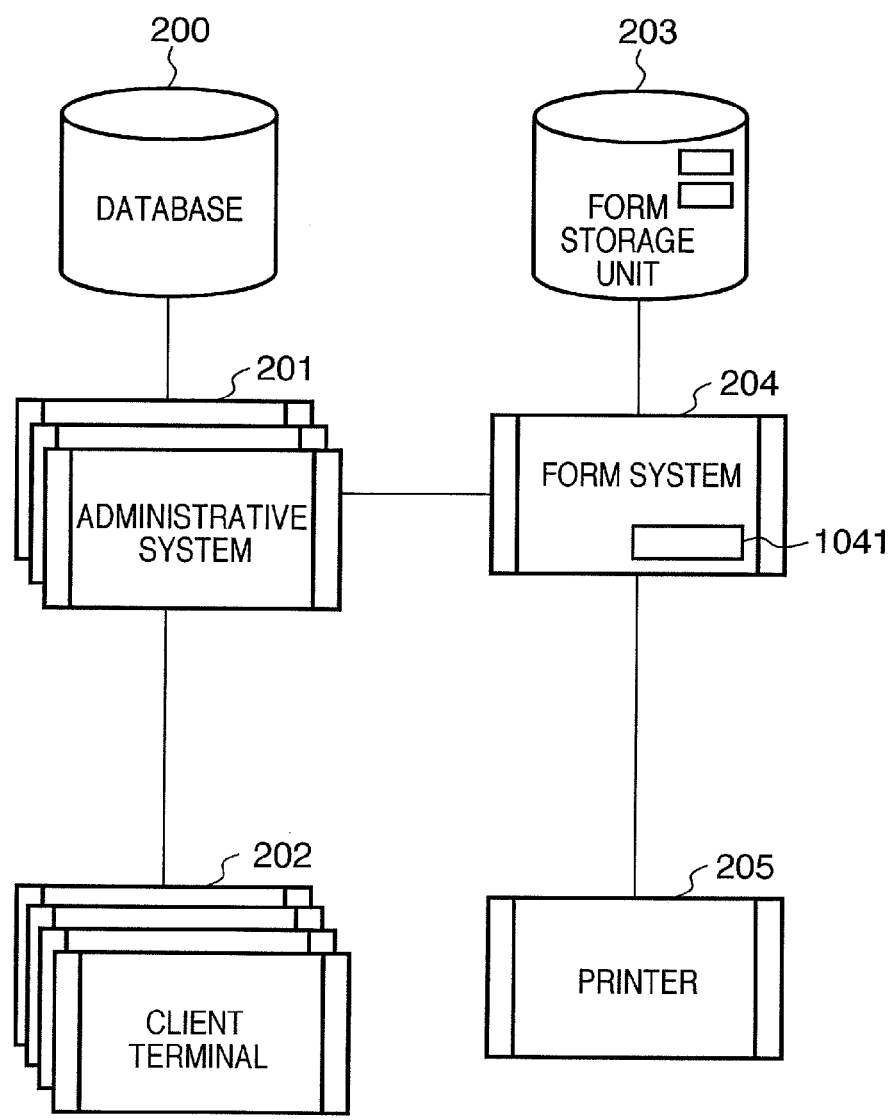
FIG. 2 is a block diagram of an administrative system suite that is collected using a new technology.

A one-to-one correspondence between the administrative system 101 and the form system 104 is present in FIG. 1. In contrast, FIG. 2 depicts a system that creates and manages, on a standalone form system, the forms that are used on a plurality of administrative systems. A database 200 is collected on a high-performance hardware. An administrative system 201, which provides a plurality of services, is collected on a compilation of a small quantity of hardware, or on a plurality of comparatively inexpensive computers, such as blade servers. The administrative system 201 runs even on a common platform that may differ from the original platform, using platform virtualization technology such as VMWARE®, in order to maintain compatibility with other administrative systems. It would be possible for a plurality of administrative systems to communicate in XML, a de facto standard data format, with the respective administrative systems being wrapped in a filter program, in order to eliminate human user involvement.

A form system 204 is unified by imageWARE® ForumManager (iWFM), by Canon, for example. The forms that are created and managed on the form system 204 are described in XML. The operating content of each respective configuration element in FIG. 2 corresponds to the operating content of each respective configuration element in FIG. 1, even though FIG. 2 has a plurality of administrative systems, while FIG. 1 has a single administrative system.

The computers that configure the form systems 104 and 204 possess a CPU that executes a program, a RAM that stores the program and data, a storage device such as a hard drive, and a network interface for connecting to the administrative system. The programs that are executed include a form edit program 1041. The data that is stored in the RAM or the hard drive includes either an XML schema 300 or a form data 1032, either of which defines the form. It is possible to create the form data 1032 by having the CPU execute the form edit program 1041.

Structure of the Order Form

FIG. 3 is an example of the XML schema 300 that defines the order form that is stored in the form storage unit 103 and 203. XML declarations and root elements have been omitted in FIG. 3. According thereto, the order from must have a hierarchical structure and a repetition such as depicted in the example shown in FIG. 4. An order data 401 is configured of a "date order placed" 411, an "order placed by" 412, an "item ordered" 413, and a "ship to" 414. The "date order placed" 411 displays the date when the order is placed, in day-monthyear format, and is data of a type "date". The "order placed by" 412 displays the name of the person who places the order, and is data of a type "string". The "item ordered" 413 displays a description of a single order, and is data of a type "item ordered", which is defined separately. The "item ordered" 413 has a definition of a repetition and a minimum and a maximum number of repetitions set, and the order 401 must contain between one and nine of the "item ordered" 413. The "ship to" 414 displays where the merchandise is to be delivered, and is data of a type "address". The elements must be arranged in the order of the "date order placed" 411, the "order placed by" 412, the "item ordered" 413, and the "ship to" 414.

The "item ordered" data type is configured of a "product name" 421, a "unit price" 422, and a "quantity" 423. The "product name" 421 displays the name of the product, and is data of type "string". The "quantity" 423 displays the quantity of the product, and is data of a type "positiveInteger". The "unit price" 422 displays the price for a single unit of the product, and is data of a type "decimal". The elements must be arranged in the order of the "product name" 421, the "unit price" 422, and the "quantity" 423.

Figure 4:
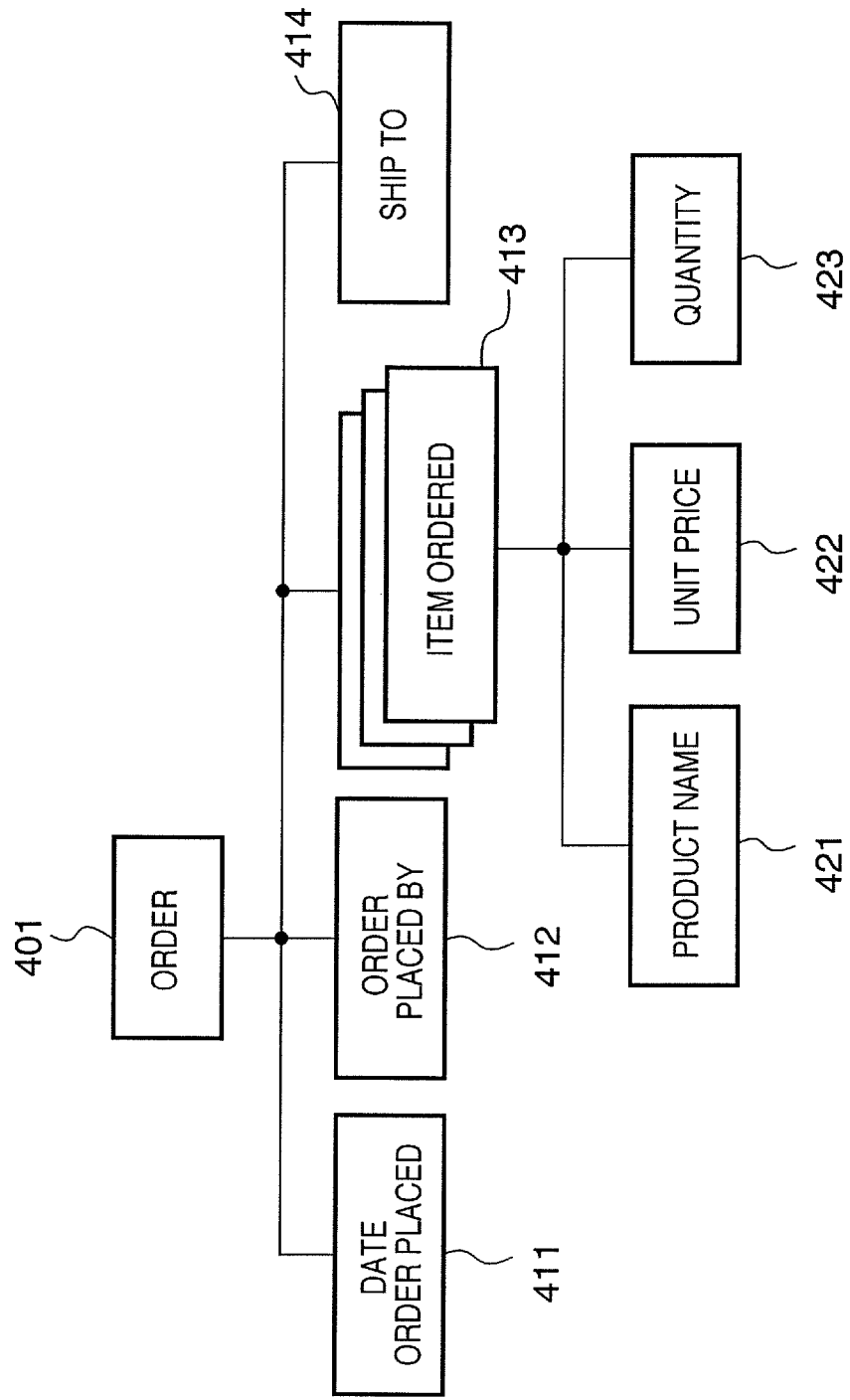
FIG. 4 is a schematic diagram of a hierarchical structure of the XML schema of the order form system.

The XML schema 300 of the order form is described so as to satisfy the definition depicted in FIG. 4. A namespace prefix xsd, which displays the namespace of the XML schema namespace in FIG. 3, is defined by the XML declarations, which have been omitted herein as being usually attached to the XML schema. The element whose element name has a prefix "xsd:" is an element of the XML schema. All elements in FIG. 3 are elements of the XML schema, and the modifier "XML schema will accordingly be omitted hereinafter with regard to the description of each respective element.

A complexType element displays a data type of either a child element or an element that possesses an attribute. The order 401 depicted in FIG. 4 possesses a plurality of child elements, and thus, in FIG. 3, the order 401 is displayed with a complex-type element 301, of the XML schema, which possesses a name property of "order". A sequence element specifies a sequence of the child elements in the order in which the child elements are arranged. In FIG. 3, the "date order placed" 411 through the "ship to" 414, which are child elements of the order 401, must be in the sequence shown in FIG. 4. The sequence is locked when the child elements are tagged with a sequence element 302.

As no child element possesses a child element itself, except the "item ordered" 413, each child element is defined by an element tag. The "date order placed" 411 is displayed by an element tag 303 that possesses "date order placed" as a name attribute, and "date" as a type attribute. The namespace prefix "xsd" is attached to the "date" value of the type attribute, making it apparent that the "date" value of the type attribute is defined in the XML schema.

In similar fashion, the "order placed by" 412, the "item ordered" 413, and the "ship to" 414 are also described using element tags 304, 305, and 306, respectively. The "item ordered" 413, however, possesses the "product name" 421, the "unit price" 422, and the "quantity" 423 as child elements, and is thus defined separately, as the "item ordered" type, as a complexType element 307. The minimum and maximum values of the element 305 that defines "item ordered" are described using a minOccurs attribute and a maxOccurs attribute, respectively.

In a manner similar to the "order" 401, the sequence of the child elements of the complexType element 307 that defines the "item ordered" 413 is defined by a sequence tag 308. The child elements that depict the "product name" 421, the "unit price" 422, and the "quantity" 423, respectively, are described by element tags 309, 310, and 311. Each respective element contained in the XML schema is referred to as a "data element", according to the embodiment.

Thus is a form, including the configuration thereof, described by the XML schema. The configuration includes the elements of the sequence and the parent-child relationship of the fields therein, as well as the repetition of the field.

Sequence of Creating a Form Analysis Process

In order to automatically create the form from the order form XML schema 300, the iWFM form editing program reads the XML schema 300. The form editing program 1041 runs on the form systems 104 and 204. The form editing program 1041 has a configuration such as per FIG. 5. Following is a description of the operation thereof, according to the configuration depicted in FIG. 5.

The XML schema that is read in by the form editing program 1041 is analyzed by an XML schema analysis unit 501. The result of the analysis is passed to an automatic table field generator 502, and stored in memory.

The XML schema 300 is analyzed on a per configuration element basis by the XML schema analysis unit 501. The data elements contained in the XML schema 300 are separated into a field name, which is a fixed form element, also referred to as a table element, that possesses a text string that is the name of the data element, and a field region, which is a variable form element that contains the substance of the data element. For example, if the form element possesses a fixed value, it is saved in memory as data possessing the value thereof. The variable form element is saved in memory as a data type and a region of a size that corresponds to the data type thereof. The form elements are the elements that configure the form, referring to each individual name of an item of data to be inputted, as well as each individual region wherein the inputted data is saved. The fields indicate each respective item that is overlaid by the inputted data in the form.

The XML schema analysis unit 501 evaluates whether each respective data element is a simple or a complex element. A simple element displays either a numerical value or a text string. A complex element collects one or more single or complex elements into a single element, and is described by the complexType element, for example. If the data element is a complex element, an evaluation is also made as to the number of child elements therein, as well as whether or not any of the child elements are themselves complex elements. The result of the evaluation is associated with the field name and the field region as a field attribute, and saved in memory, etc. The field attribute thus saved is passed to the automatic table field generator 502. The field attributes include a pointer to a successive field, a pointer to a parent field if the field is a child field, and a pointer to a child field if the element is a complex element. Such pointers facilitate sequential calculations. The field name, the field region, and the field attributes are batch defined on a per field basis within the form. Collectively, the information is referred to as a field or field definition data.

Figure 6:
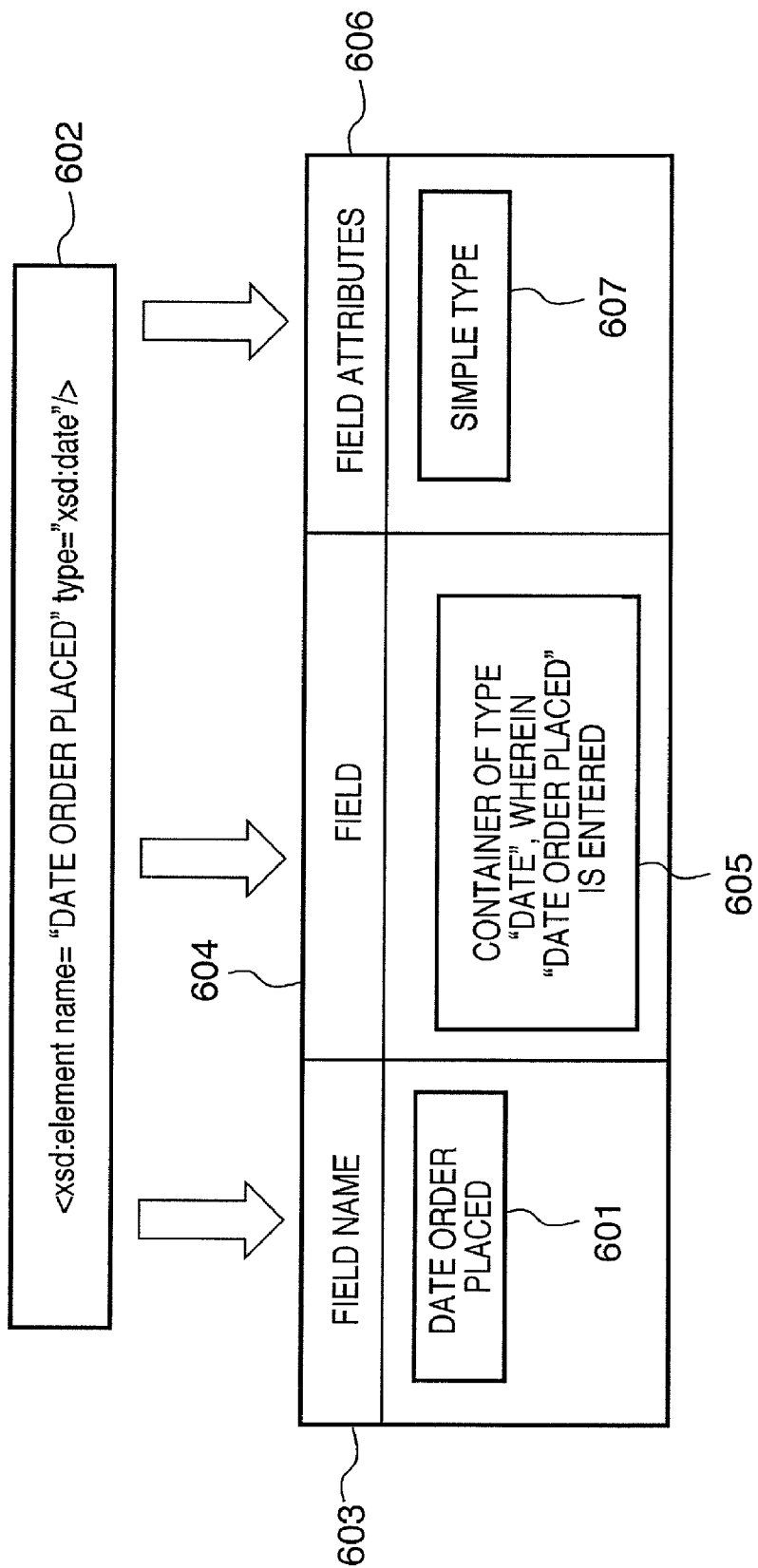
FIG. 6 is a detailed rendering of a simple data element.
Figure 7:
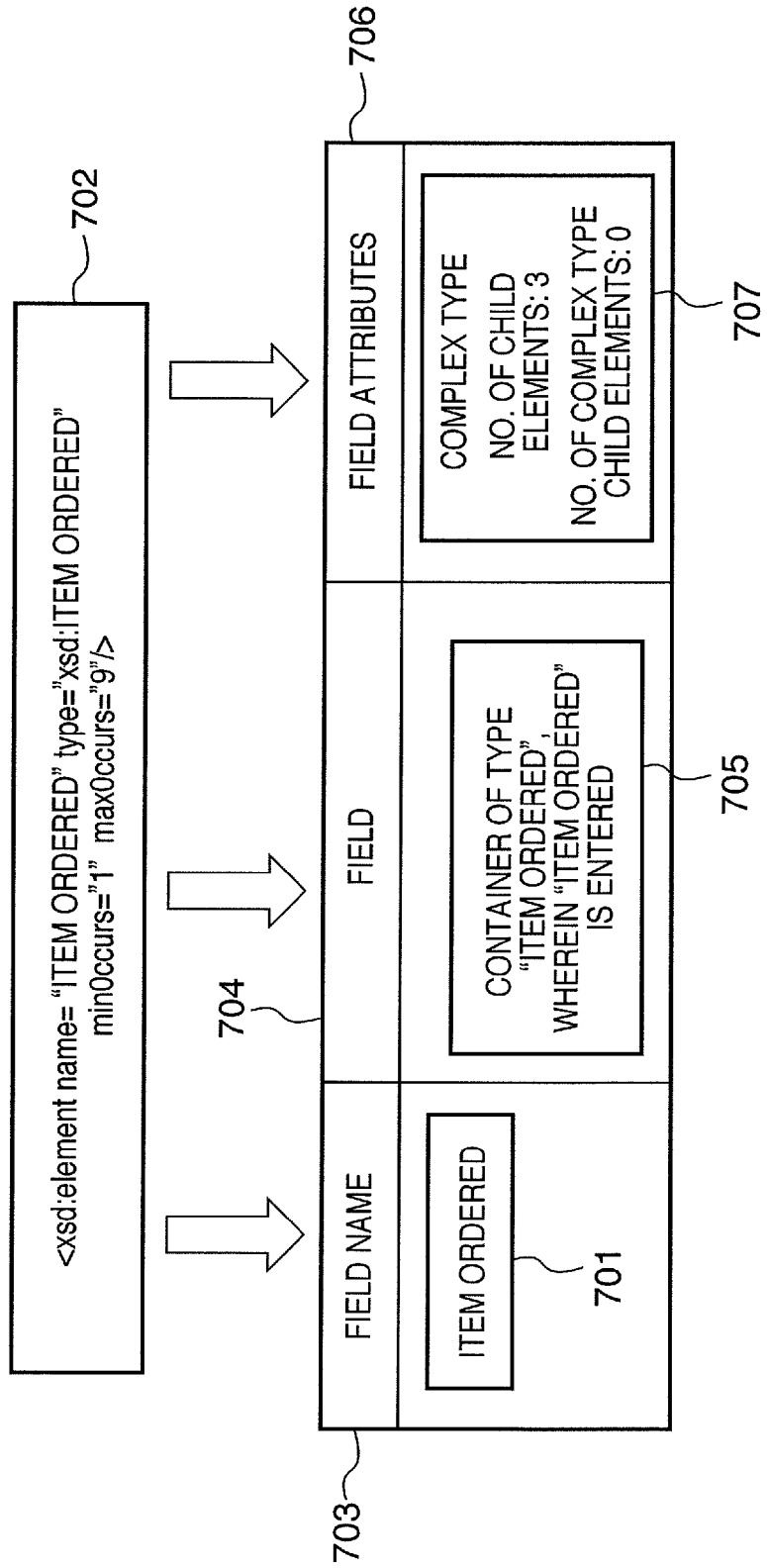
FIG. 7 is a detailed rendering of a complex data element.

FIG. 6 through FIG. 8 give a concrete description of the analysis process. The XML schema analysis unit 501 reads in the XML schema 300 depicted in FIG. 3, with the complexType element 301 being read in first. The form element of the field name is created from the "name" attribute of the element 301. The form element possesses the value of "order". The element 301 is a complexType element, possessing the elements 303 through 305 as child elements. A region is secured as a field region capable of containing each of the respective data types of the elements 303 through 305, in sequence.

The sequence element 302 is read in. The sequence element regulates the sequence of the child elements, and thus, when an element is read in that is between sequence elements, the sequence of the element thus bounded by sequence elements is fixed by the arrangement thereof. Thus, for example, the arrangement of the elements is stored as information, including the field attributes, by the pointers depicted in FIG. 8.

When the element tag 303 is read in, the field element known as the field name is created from the "name" attribute thereof. The field element known as the field that stores the data of type "date" is created from the "type" attribute thereof. The elements are simple elements, based on the attributes thereof, and thus, a field attribute data denoting the simple element type is created and passed to the automatic table field generator 502. FIG. 6 depicts the situation thus described. A field definition data 601 is depicted in FIG. 6. While the attribute values of the elements 304 and 306 differ from the attribute values of the element 303, the processing thereof is the same.

As with the element 305, the "order item" data type is undefined when the element 305 is read in, and thus, the creation of the form elements other than the field name is postponed.

When the complexType element 307 is read in, it is possible to determine from the value of the "name" attribute that the element 307 defines the "order item". The field that possesses the "order item" field name is a complexType field with three child elements, to wit, the child elements 309, 310, and 311 of the complexType element 307. Each of the child elements is a simple element, making it possible to determine that no complexType child elements are present. The field attributes of the "order item" field have values that denote that the field is a complexType with three child elements, none of which are themselves of the complexType. The form elements are created as field regions of the "order item", with the field region types in the sequence of "string", "positiveInteger", and "decimal". The situation is depicted in FIG. 7, wherein a field definition data 701 is depicted.

FIG. 8 depicts an example of a configuration that depicts a parent-child relationship of the elements that are described in the XML schema 300 as the parent-child relationship between the fields in the order form. The field attributes describe pointers such as depicted in FIG. 8, in addition to the foregoing information. Using the XML schema 300 in FIG. 3, the XML schema analysis unit 501 is able to determine that the data elements 303 through 306 are child elements of the data element 301, and the data elements 309 through 311 are child elements of the data element 305. A pointer 821 displays a sequence between the fields that correspond to the parent field. The pointer 821 in FIG. 8 depicts that a parent field 802 continues directly on from a parent field 801. The field that is generated from the element tag that is described in the sequence element is assigned a sequence by the pointer 821. The sequencing between the fields of the child elements are similarly defined by a pointer 812 in FIG. 8 for the child elements as well.

A pointer 822 points from the parent field to the child field. If a plurality of child fields are present, a pointer to each respective child field is maintained. Conversely, a pointer 823, from the child field to the parent field, is also saved. The pointers are generated as data that connects between the parent fields and the child fields that correspond to the parent elements and the child elements in the XML schema, respectively. Each respective pointer, for example, points to an address in memory wherein each respective field is saved, and especially to a memory address of the field attributes.

Accordingly, regarding the field attributes that correspond to the XML schema in FIG. 3, the pointers to the child elements 303 through 306 are recorded in the field attributes of the element 301, and the pointers to the child elements 309 through 311 are recorded in the field attributes of the element 305. The pointers that point in the opposite directions are also recorded in the field attributes of each respective child element. The pointer that denotes the sequence that is defined by the sequence element is also defined in between the elements of each respective level.

When the analysis of the XML schema and the storage of the results, i.e., the field name, the field region, and the field attributes, is completed, the sequence proceeds to an automatic layout process.

Automatic Layout Process

An automatic table field layout unit 503 performs the automatic layout process, in accordance with the results generated by the automatic table field generator 502. The process is depicted in FIGS. 9A and 9B.

Figure 9A:
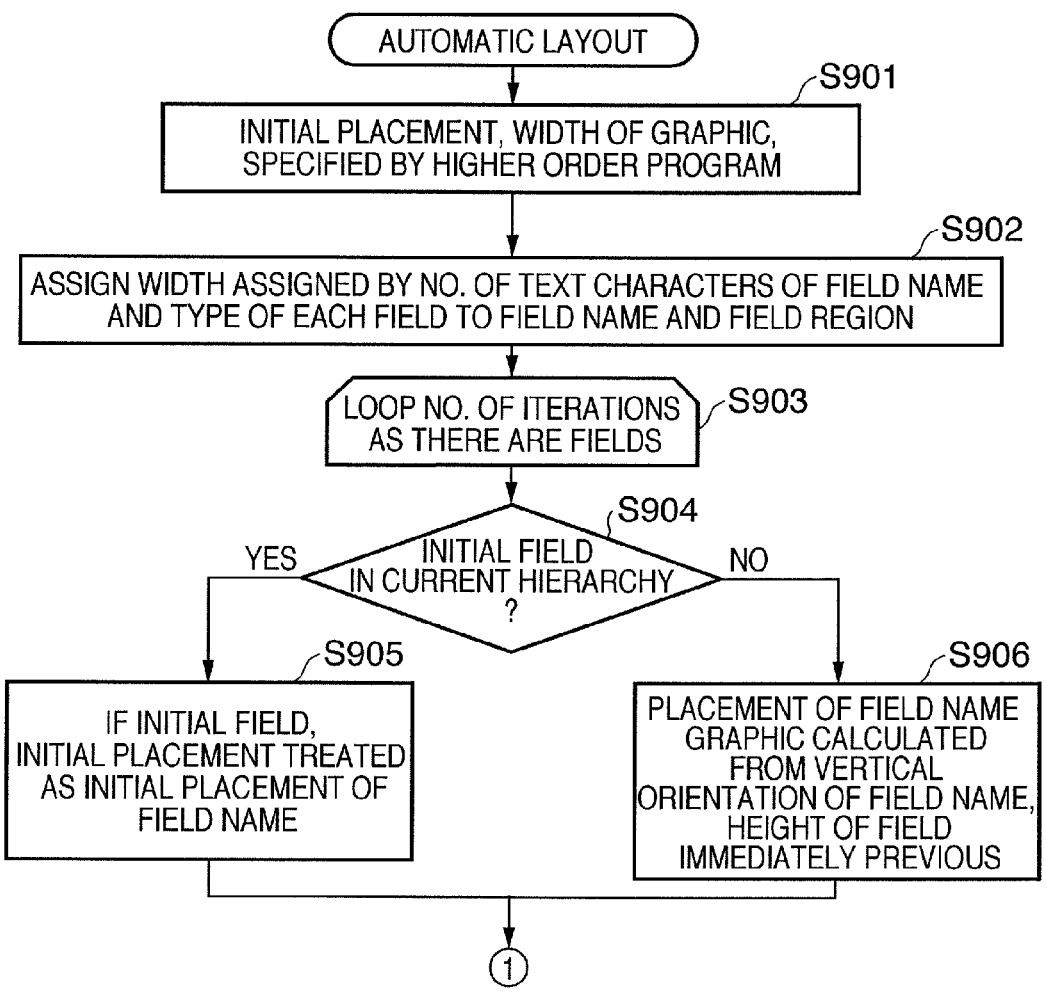
FIGS. 9A and 9B are automatic field placement process flowcharts.
Figure 9B:
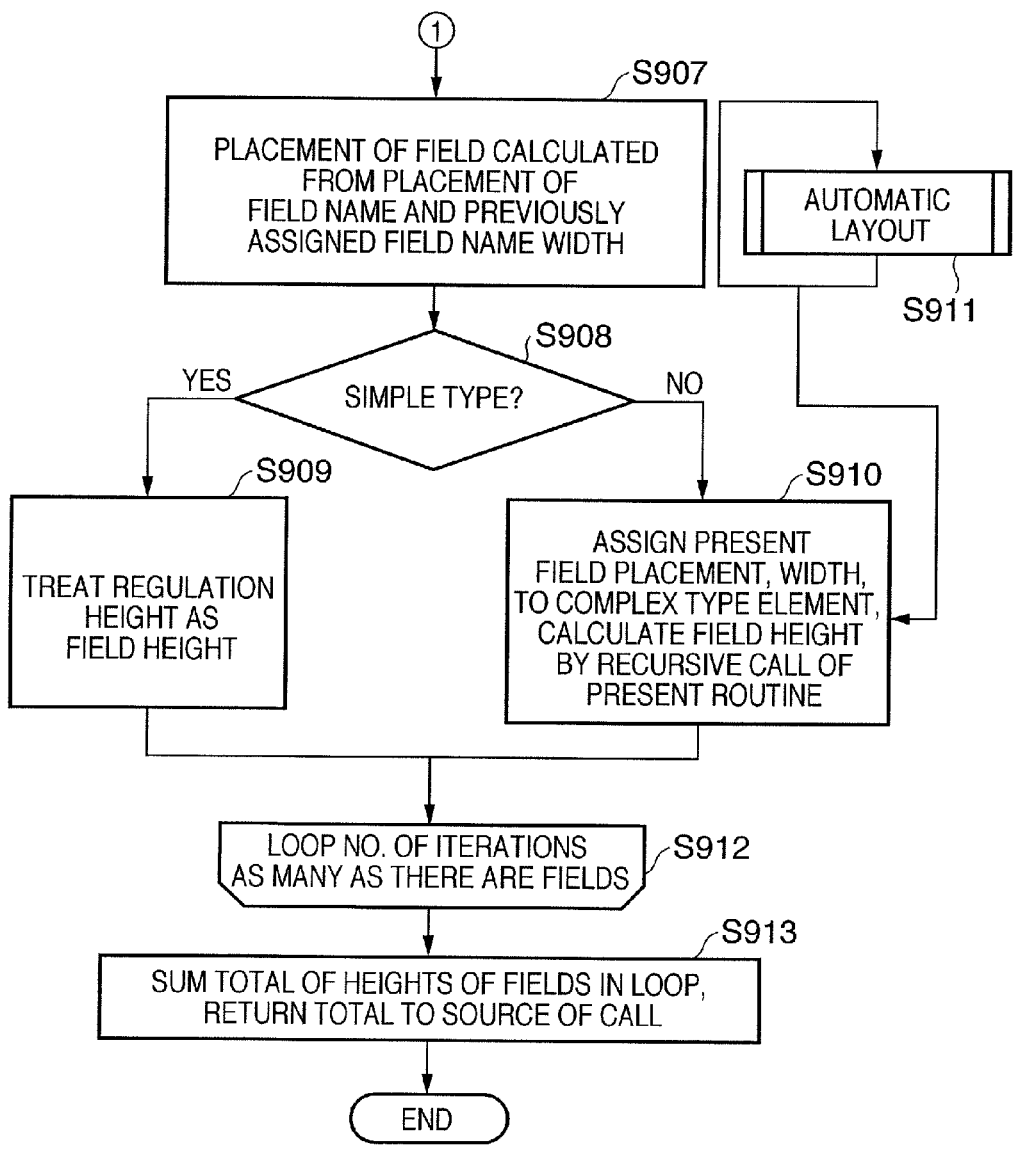

The process in FIGS. 9A and 9B is a recursive process. The process in FIGS. 9A and 9B is called recursively, with each appearance of a complexType element in the course of the process. Performing the process by thus going down to all of the simple elements, then back up to the next process, in a repetitive fashion, results in the overall process being carried out. The relationship between the parent element and the child element with regard to the XML schema is also reflected in the field definition data. Hereinafter, the field definition data that corresponds to the parent element and the child element will be referred to as the parent field and the child field, respectively.

In step S901, an initial placement and width of the form are specified, and the automatic layout process is called, by a higher order program. For example, the initial placement and width that the user enters prior to processing are passed to the automatic table field layout unit 503 in step S901. If called recursively, a parameter that is present when the call is made is passed. The parameters will be collectively referred to as initial placement and width specified at a higher order. In step S902, the automatic table field layout unit 503 calculates an initial placement for the field name and the width of the field region in a horizontal orientation for each respective field. More concretely, all of the field name and field region data types of the current hierarchy are examined, and a width specified at a higher order is assigned to the field name and the field region such that each respective field name and field region is displayed appropriately. If the current hierarchy contains a plurality of fields, however, the field name with the most text characters is made a baseline for the field name width. For example, a number of text characters times a prescribed width, i.e., a width per character, is assigned to the field name in the current hierarchy, and the rest is assigned to the field region in the current hierarchy.

Figure 10:
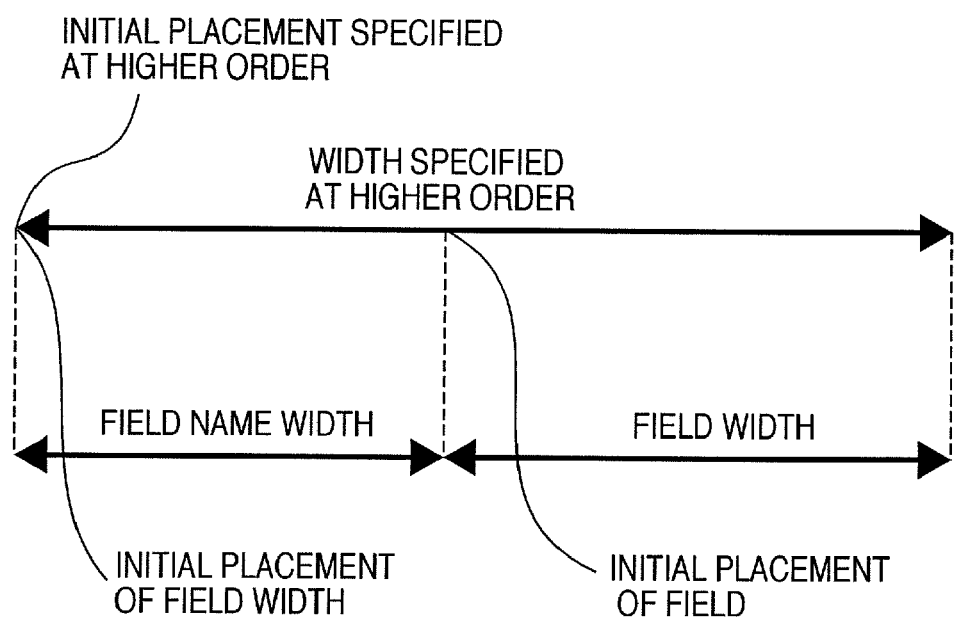
FIG. 10 is a conceptual illustration of a calculation of a width of a field.

The initial position of the field name in the current hierarchy in the horizontal orientation matches the initial placement specified at a higher order. The field name width is added to the initial placement of the field name, and the horizontal orientation of the initial placement calculated, as per FIG. 10.

In steps S903 through S912, an initial placement in a vertical orientation of the field name width and the field region is calculated. Steps S903 and S912 signify a repeating loop execution of a process therebetween, according to a condition therein.

Figure 11:
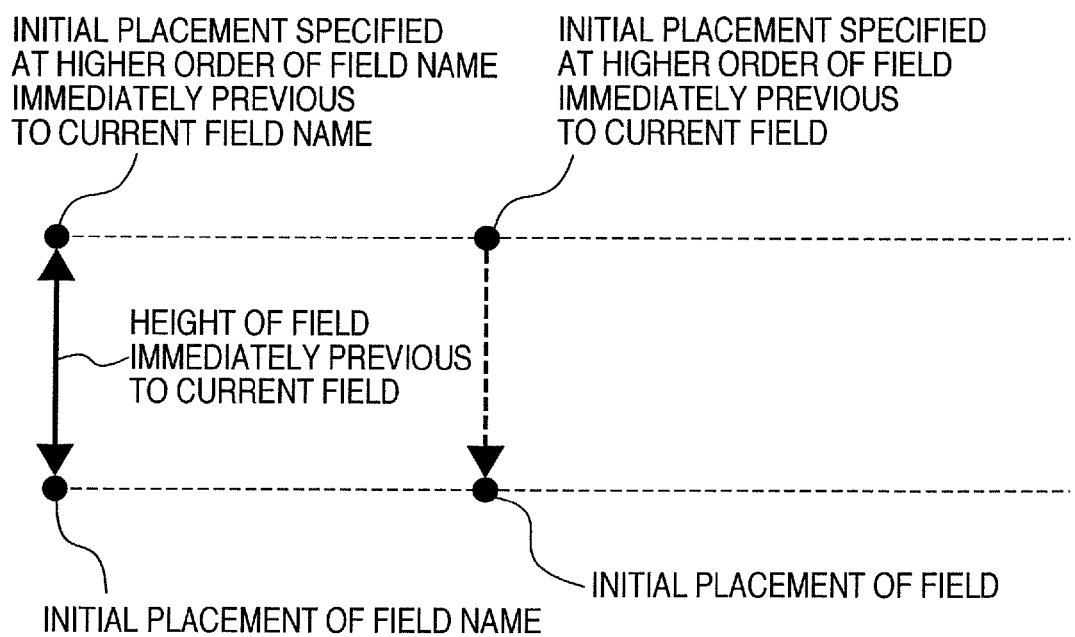
FIG. 11 is a conceptual illustration of a calculation of an initial position of a field.

In step S904, a determination is made as to whether or not the field that is currently being calculated is the initial field in the current hierarchy. If it is, the initial placement in the vertical orientation specified at a higher order is treated as the initial placement in the vertical orientation of the field name and the field region, per steps S905 and S907. The placement and the width of the field name and the field region so determined would be associated with the field, for example, as a portion of the field attributes, and saved in the form storage unit 103 and 203, for example. The same is true of other values thereof. If the field that is currently being calculated is not the initial field in the current hierarchy, the initial placement in the vertical orientation of a field immediately previous is shifted downward by the height of the field immediately previous, and the placement calculated therefrom. The placement is saved as the initial placement in the vertical orientation of the field name and the field region, per steps S906 and S907, and FIG. 11.

Figure 12:
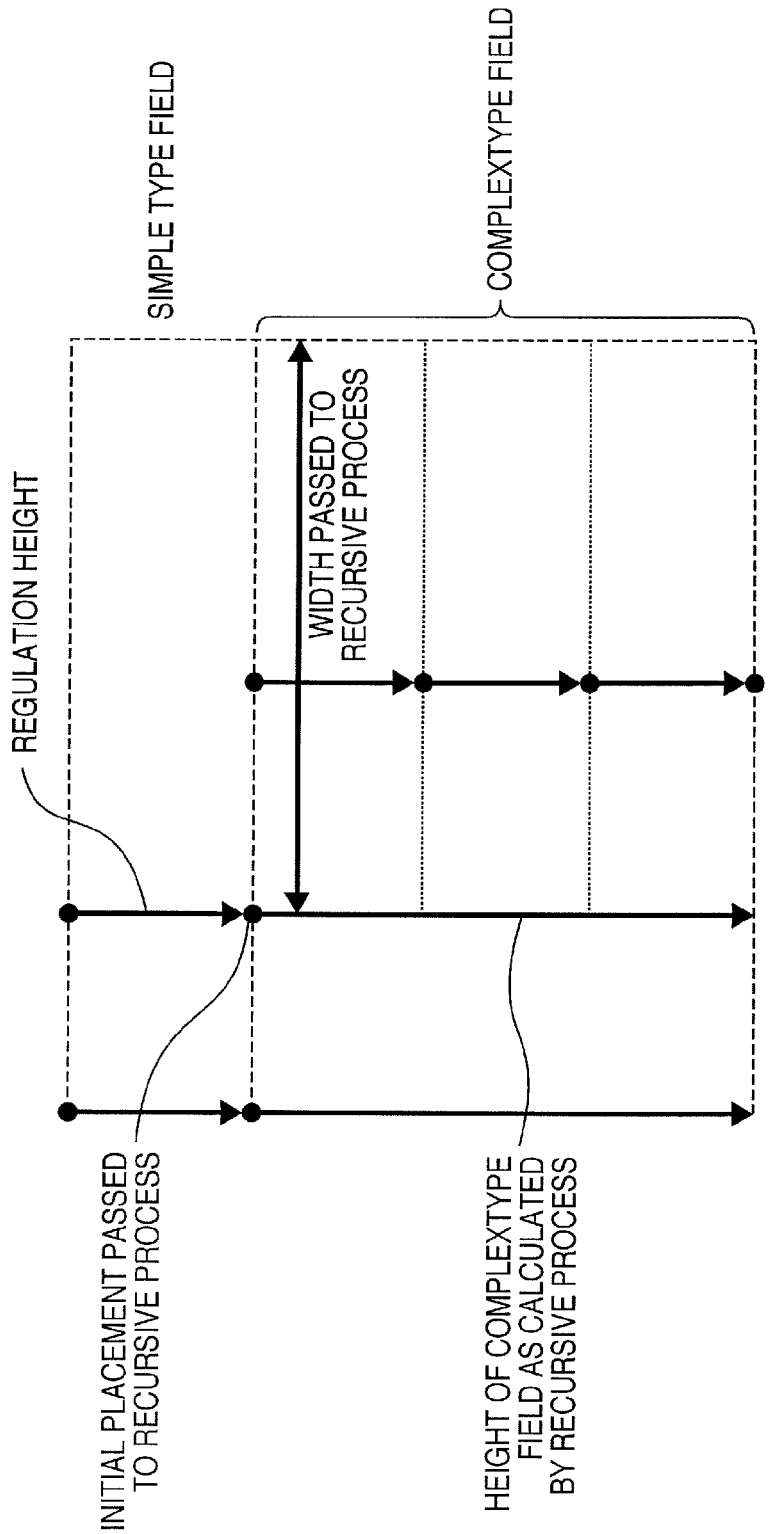
FIG. 12 is a conceptual illustration of a height of a field.

The height of the field name and the field region are calculated. In step S908, a determination is made as to whether or not the field is a simple type element or not. If it is a simple type element, the height of the field will be set in step S909 to either a pre-defined regulation height, or a height that the user specifies. If, on the other hand, the field is a complexType element, then, in step S910, the initial placement and the width of the present field, as derived in step S907, are assigned as the initial placement and the width specified at a higher order, and the automatic layout process in FIGS. 9A and 9B is called recursively in step S911. Thus, even the child fields that are associated with the complexType element are laid out within the present field, as depicted in FIG. 12.

Repeated performance of the process thus far on the fields in a given hierarchy locks the initial placement, the width, and the height of each respective field name and each respective field region. The layout information is associated on a per field basis and saved. The heights of the fields are totaled and returned to the origin of the higher order call as the height of the complexType element.

Processing with a Repeating Loop

The preceding has been a description of the analysis process and the automatic layout process with no repeating loop, containing only the hierarchical configuration. Following is a description of the process with a repeating loop present, with reference to FIGS. 14A and 14B. Steps in FIGS. 14A and 14B that correspond to steps in FIGS. 9A and 9B will be omitted.

When a data element is defined as having a repeating loop in the XML schema, the automatic table field generator 502 sets a repeat flag in the field attributes that correspond to the data element. In step S1401, the automatic table field layout unit 503 queries the repeat flag in the field attributes, and increments the height when the field is positioned by a certain value, in step S1402. If the repeating field is displayed in the FM editor, a rectangle is formed of the incremented height in the lower part of the field name and the field region, and a symbol that signifies the loop is displayed within the rectangle. Thus, the user is notified that the field is defined as having the repeating loop.

Output

The field name and the field region are automatically generated and laid out, and the placement and the size thereof established, as a result of the operation of the automatic table field generator 502 and the automatic table field layout unit 503, according to the sequence in either FIGS. 9A and 9B or FIGS. 14A and 14B. The placement and the size of established table elements, i.e., the field name and the field region, are saved in the form storage unit 103 and 203 as layout data. According to the layout data, for example, ruled lines are drawn, and the values of the field name and the field region inserted into the table according to the respective placement and size thereof. When laying out the table, what is generated is such as FIG. 13, table 1301. The table 1301 thus created is displayed in a screen of form edit program 1041, via a form display unit 504 in FIG. 5.

The result of an automatic placement when a repeating loop is present is such as FIG. 15, table 1501. Given that the repeat is defined in the XML schema 300 in FIG. 3, the table 1501 is created and displayed based on the XML schema 300. A repeating loop symbol 1502 is displayed directly beneath the repeating loop field. Merging an XML data 1601 depicted in FIG. 16, which conforms to the XML schema of the order form system, with the form that possesses the table depicted in FIG. 15, completes a form data depicted in FIG. 17.

Each respective tag depicted in FIG. 17 corresponds to the field name in the form. The data that is described in the name tag that matches the field name is inserted into the corresponding field region. For example, the XML data 1601 depicted in FIG. 16 is inputted via a webpage that is provided to the client terminal by the ordering system, and passed to the form system 104 and 204, which composites the values received from the administrative system with the form that is created by the form edit program 1041, in accordance with the identity between the field name and the tag name.

Thus, defining, in the XML schema, the data type of the field name and the field region of the form, as well as the sequence and the presence, or lack thereof, of a repeating loop, of a form, causes the allocation of appropriate width and height to each respective field name and field region, and the layout thereof. The placement and width thus laid out are saved on a per field basis, as the field attributes, for example. When displaying or printing out the form, the field attributes are queried, and the form is re-configured according to the placement and width recorded therein. Simply defining each respective field thus spares the operator the effort that would be otherwise involved with the layout. The layout of the form thus created reflects the arrangement of each respective field that is defined in the source XML schema, as well as the parent-child relationships therebetween, allowing immediate grasping of the content thereof.

Figure 5:
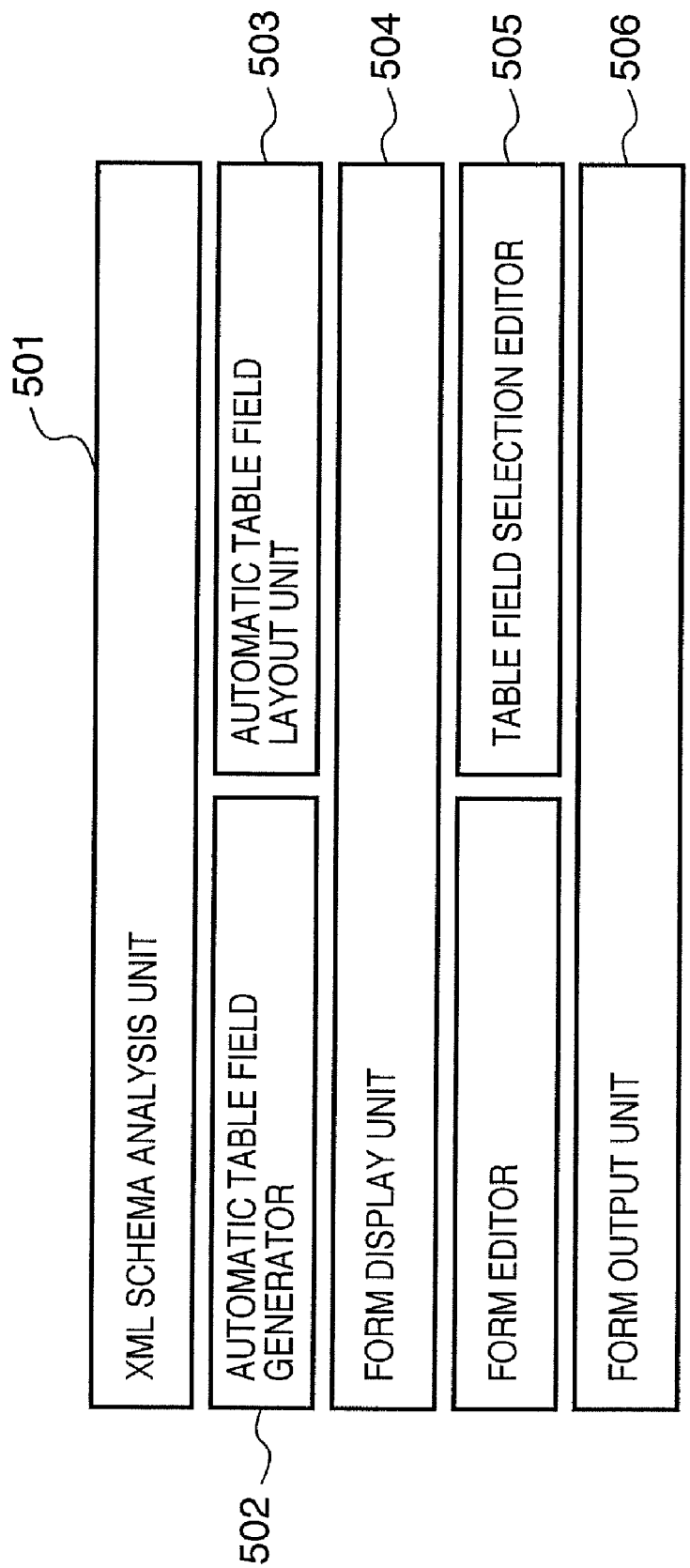
FIG. 5 is a structural diagram of an FM editor module.

Of the software elements depicted in FIG. 5, the table editing apparatus according to the embodiment need not possess a table field selection editor 505.

Second Embodiment

The form is automatically generated based on the XML schema, from the sequence in FIGS. 9A and 9B and FIGS. 14A and 14B. The result is an automatically generated layout, however, and there is no assurance that the user will approve of the resulting layout. Therefore, it is possible to use the table field selection editor 505 to further edit the form, according to the embodiment. To do so, the user might, for example, right-click on the field name or the field region to be edited. The configuration of the system according to the embodiment is similar to the configuration of the system according to the first embodiment. Accordingly, the description according to the embodiment is restricted to user operation and runtime examples, as well as flowcharts. Four flags are added to the field attributes according to the first embodiment: a display parent field name flag, a display child field name flag, a lateral alignment flag, and a display all flag. There is no flag for totaling of a given set of values, as doing so is a processing instruction. If the display parent field name flag is set, the name of the parent field that corresponds to the complexType element is displayed. If the display child field name flag is set, the name of the child field that corresponds to the child element that is associated with the complexType element is displayed. If the lateral alignment flag is set, the corresponding field name and field region are displayed in a lateral alignment with the other fields in the same hierarchy. If the display all flag is set, the field names of the repeated fields are all displayed together. If the total given set of values instruction is ordered, a row is added in the bottom field of the form for showing the requested totals. While the foregoing assumes a display of data, the form data itself can be edited in response to the value of each respective flag, according to the first embodiment. The same holds true for the following description as well.

When the user right-clicks on the field in the form that is displayed in a user interface, the form edit program 1041 queries the field attributes of the field that corresponds to the placement of the click. The form edit program 1041 evaluates the field type, i.e., simple or complexType, and, if complexType, whether or not the child fields thereof are all simple elements, as well as whether or not a repeating loop field is present. The form edit program 1041 displays a layout selection menu in response to the results of the evaluation. The layout selection menu displays items corresponding to the display parent field name flag, the display child field name flag, the lateral alignment flag, the display all flag, and the total given set of values instruction, respectively. The value of each respective flag that is maintained in the field attributes of the selected field is displayed with a check mark for each individual menu item.

FIG. 18 depicts a simple example of a display of a layout selection menu. The placement currently selected in the menu depicted in FIG. 18 is a complexType field region with child fields that are all of the simple type, and with no repeating loop fields present. The top two items in the menu depicted in FIG. 18, reference numerals 1801 and 1802 respectively, signify that the derivation thereof is the complexType field. Reference numeral 1803, the item in the center of the menu, signifies that the derivation thereof is the complexType field, and that the child fields thereof are of the simple type. The bottom two items, reference numerals 1804 and 1805 respectively, signify that the derivation thereof is the repeating loop field. The item that satisfies the condition is marked with a check mark to its left in FIG. 18. While it would be permissible to display flags that are not derived from the selected fields, such as, for example, the simple type field items 1801 and 1802, not displaying such flags would be preferable. It is possible for a user operation to change the value of each respective flag within the menu. Following is a description of the operation when a menu item that is associated with a flag is selected, or set.

Operation when Setting the Display Parent Field Name Flag

Figure 19:
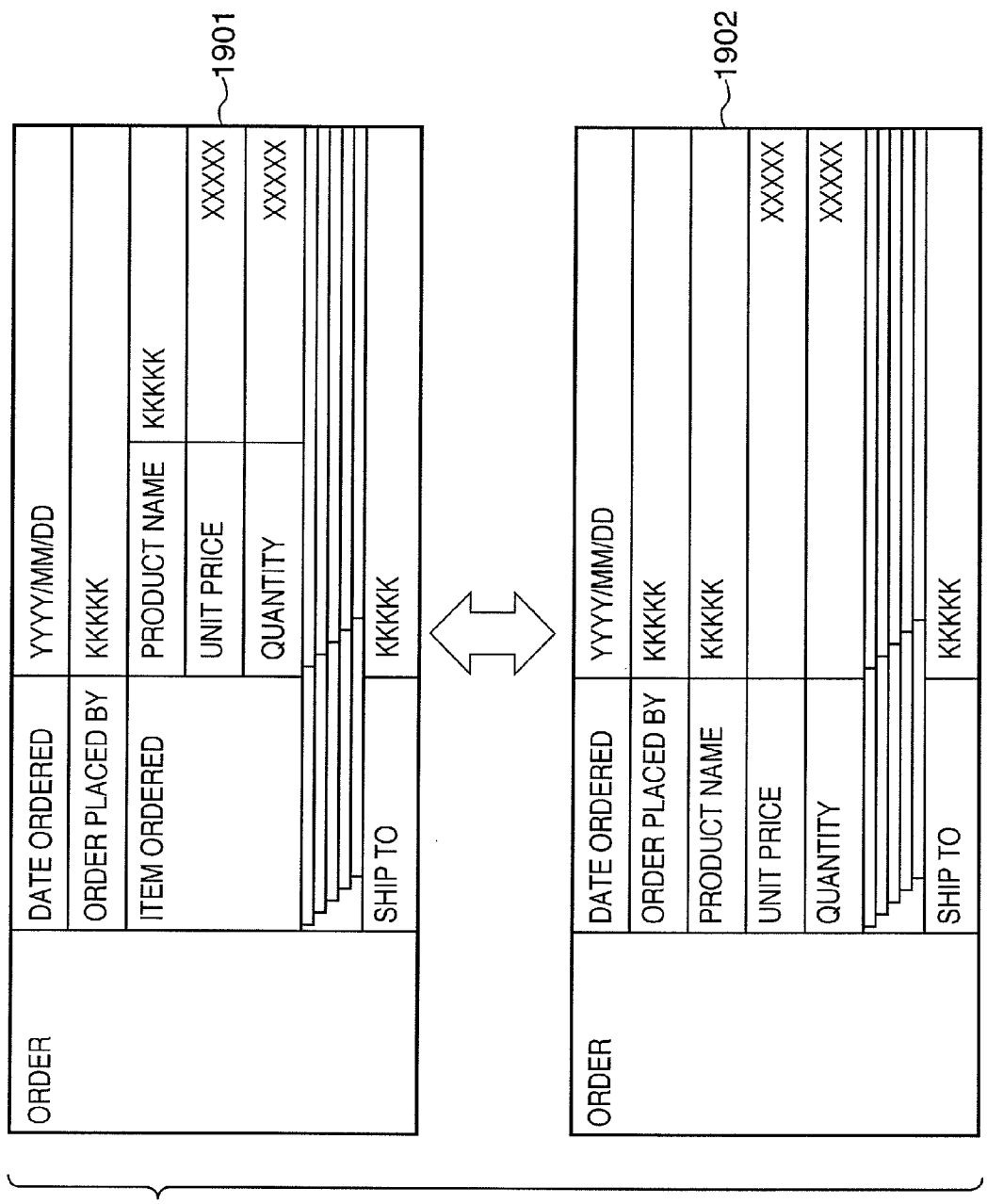
FIG. 19 is a layout that appears when selecting a parent field name display.

The default setting is to set the option, i.e., the display parent field name flag. "Option" is synonymous with "flag" in the present circumstance. When the option is selected in the table field selection editor 505, the automatic table field layout unit 503 is launched, and the layout changes to a layout such as is depicted in FIG. 19. The same holds true for the other options as well. In the example depicted in FIG. 19, the display parent field name flag of the field attributes of the complexType field is operated so as to change from a set state 1901 to a reset state 1902.

Figure 20:
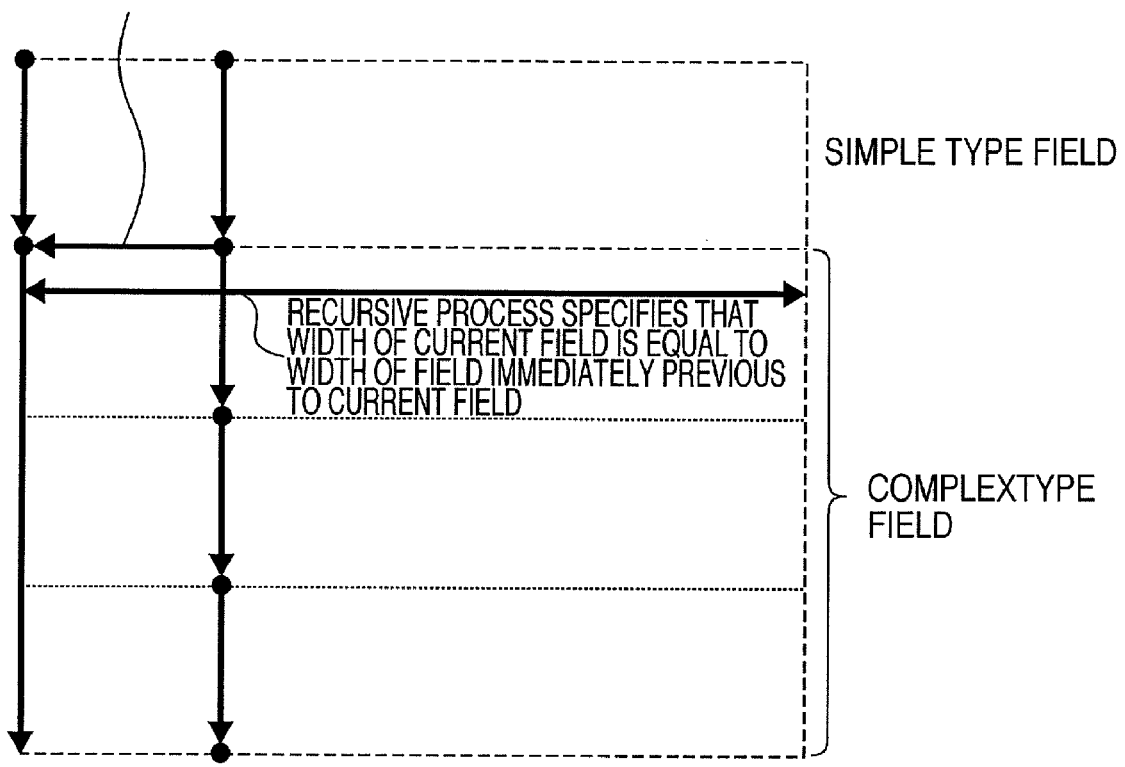
FIG. 20 is a conceptual illustration of a complex field layout calculation that is performed when the parent field name is not displayed.

When the option is selected, the form edit program 1041 performs a partial automatic layout process on the form. The form edit program 1041 sets the display parent field name flag of the field with the complexType data type, i.e., the complexType field, to not display, i.e., the form edit program 1041 resets the display parent field name flag. The automatic table field layout unit 503 shifts the initial placement of the field region of the complexType field to the initial placement of the parent field name, in accordance with the setting, while also adding the width of the parent field name to the width of the field region of the complexType field. The form edit program 1041 specifies the initial placement and the width of the field with regard to the recursive processing of the layout within the field region of the complexType field, as per FIG. 20. The width of the field changes as a result, and the height may also change if the data within the field region is set to expand to display all of the data entered therein. If the height of the complexType field that is being edited changes, the layout will be adjusted accordingly, by altering the initial placement of the succeeding fields. A flowchart that contains the foregoing function is depicted in FIGS. 21A and 21B.

Figure 14A:
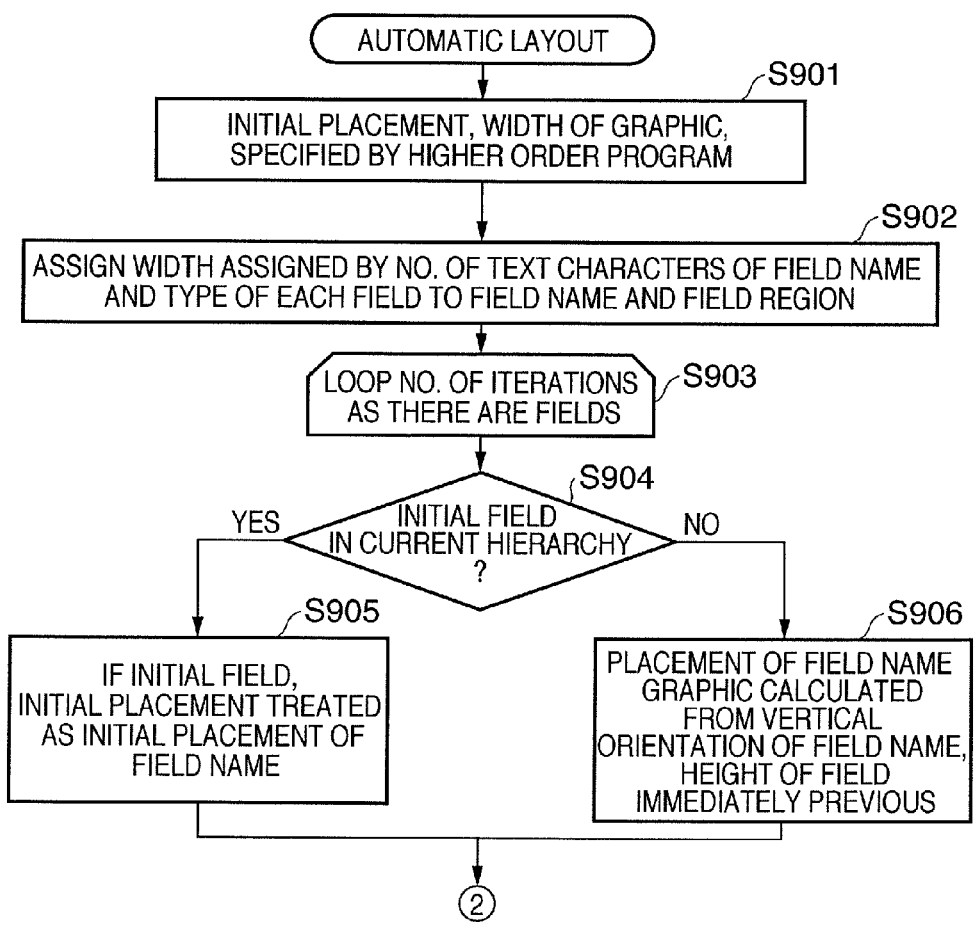
FIGS. 14A and 14B are flowcharts of an automatic field layout process that is performed when a repeated table element is present.
Figure 14B:
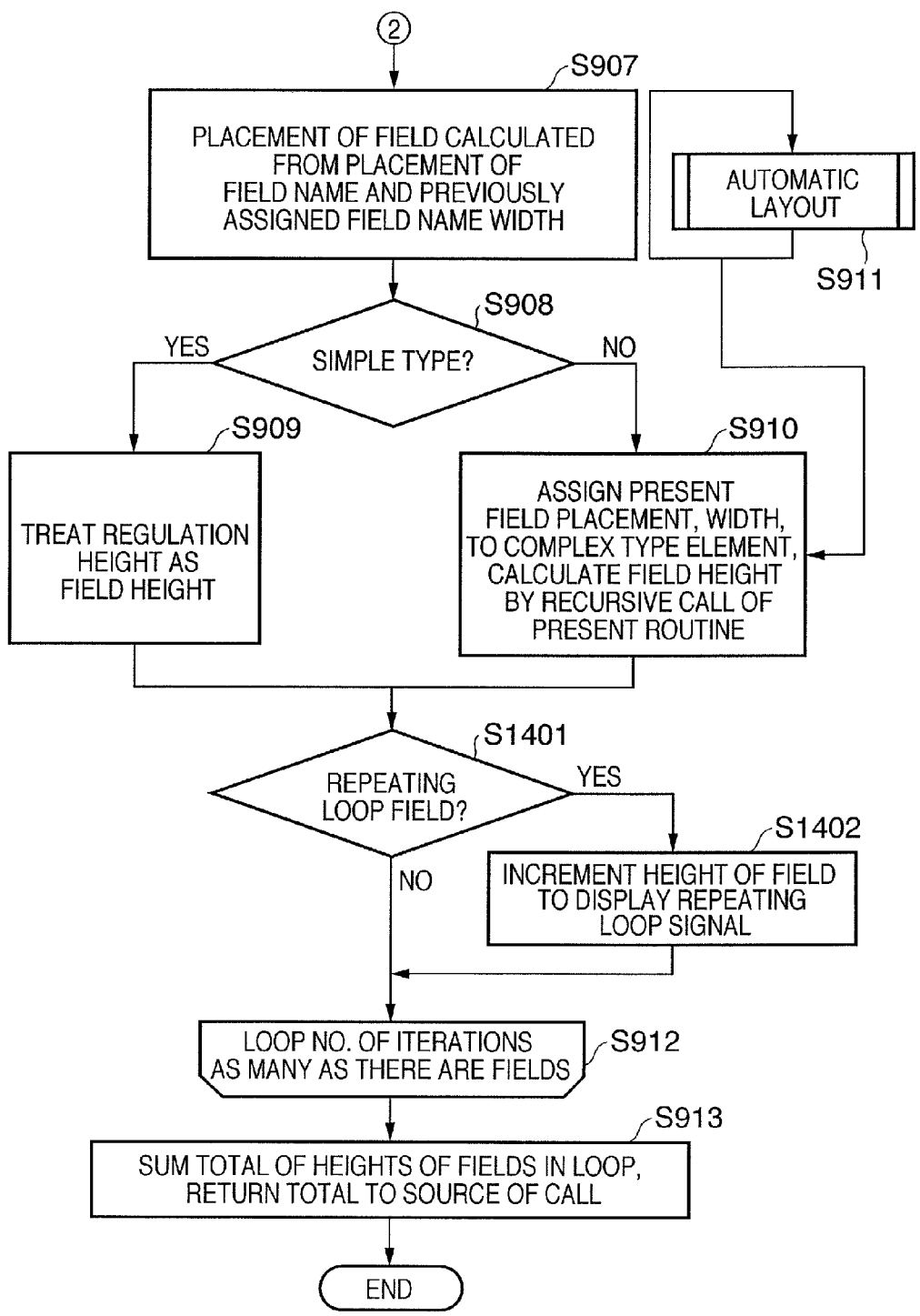
Figure 21A:
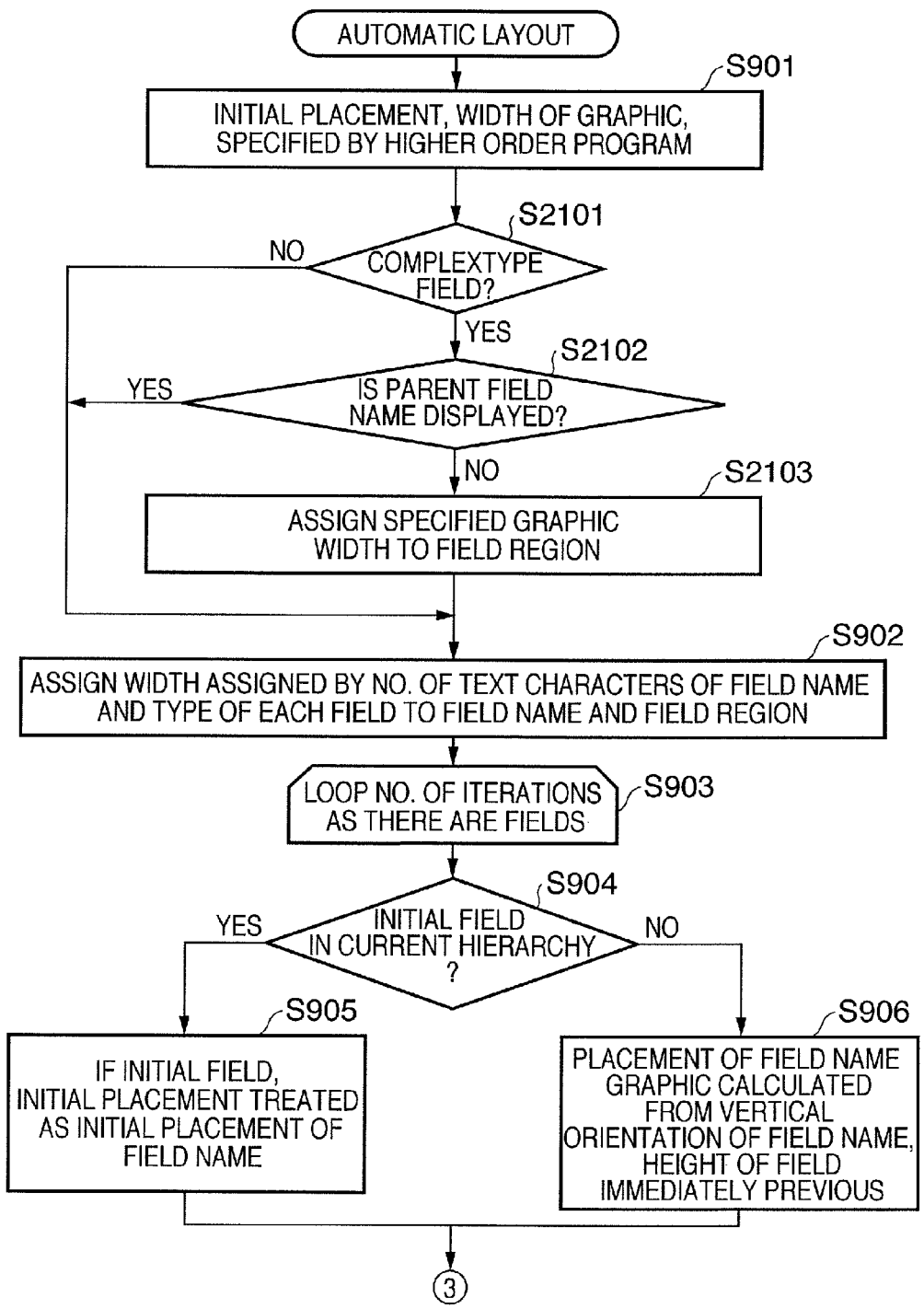
FIGS. 21A and 21B are flowcharts that is invoked when the parent field name is not displayed.
Figure 21B:
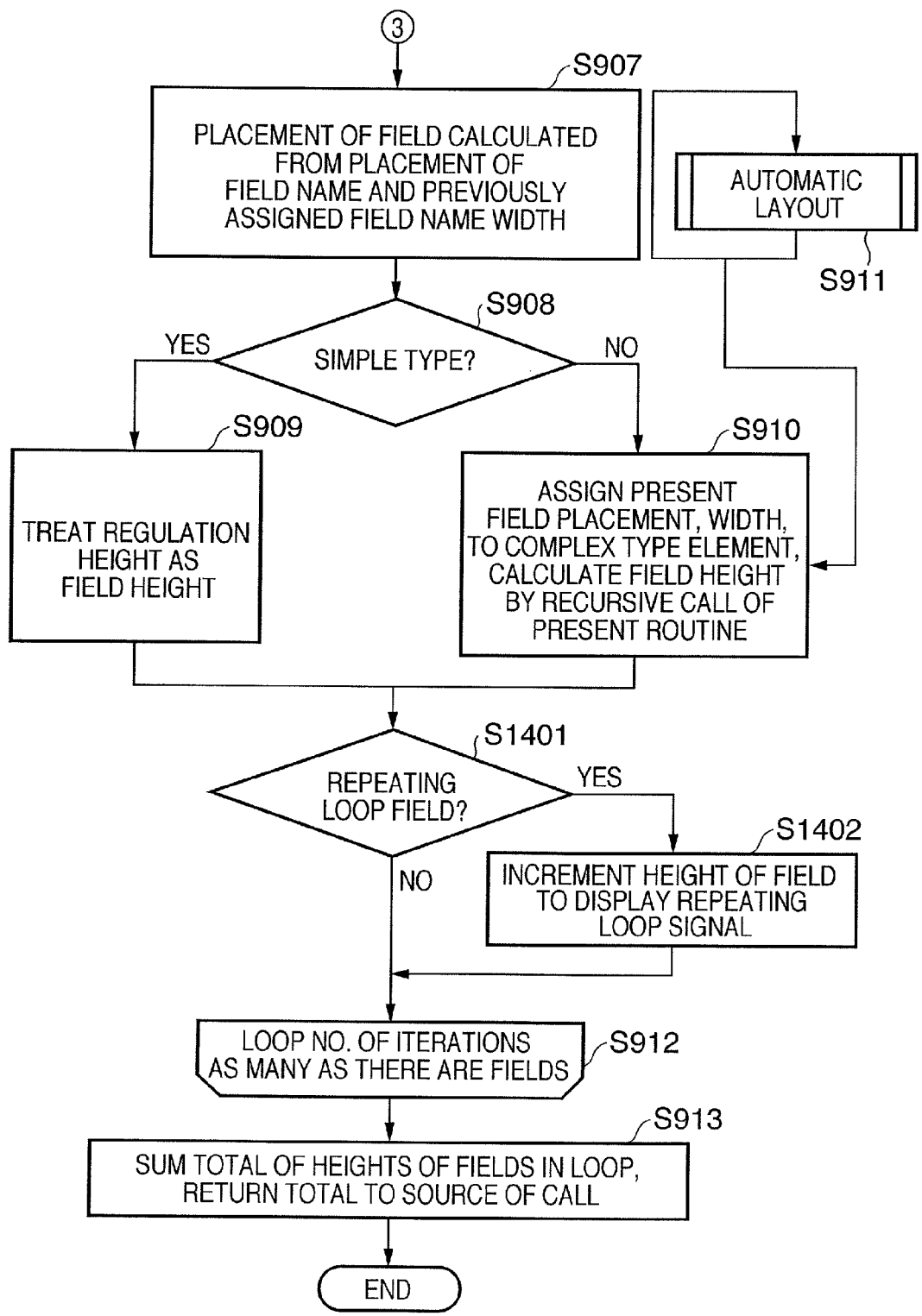

The steps in FIGS. 21A and 21B that correspond to the steps in FIGS. 14A and 14B are marked with identical reference numbers. Only the differences between FIGS. 14A and 14B and FIGS. 21A and 21B will be described hereinafter.

In step S2101, the field attributes are queried, and a determination is made as to whether or not the field is a complexType field. If the field is a complexType field, the display parent field name flag is tested in step S2102. If the display parent field name flag is unset, the entire specified graphic width is assigned to the field region in step S2103. The process jumps to S902 either after step S2103, or if either of the conditions is not met. Once the layout is set, the field name of the parent field whose display parent field name flag is not set is not displayed when the form display unit 504 displays the form. The same holds true for printing the form as well.

Operation when Setting the Display Child Field Name Flag

Figure 22:
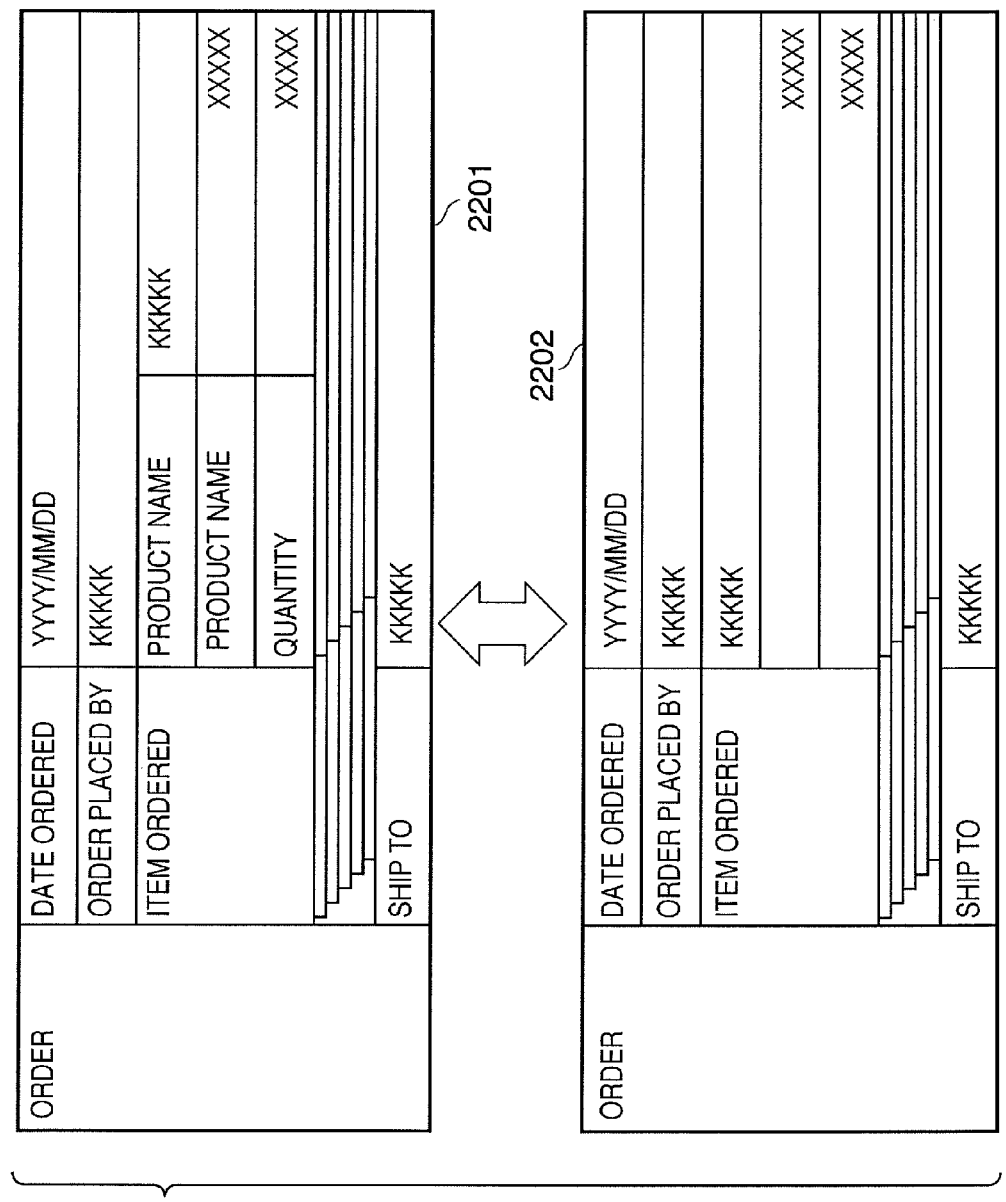
FIG. 22 is a layout that appears when selecting a child field name display.

The default setting is to set the option, i.e., the display child field name flag. When the option is selected, the layout changes from a set state 2201 to a reset state 2202, such as the layout depicted in FIG. 22. When selecting an option, the form edit program 1041 performs the partial automatic layout process. The form edit program 1041 sets the child field name of the complexType field to not display. The automatic table field layout unit 503 halts the process of assigning the width that is specified by a higher order to the field name and the field region, setting the field name width to zero, and the field region width to the width that is specified by a higher order. A flowchart that contains the foregoing function is depicted in FIGS. 23A and 23B.

Figure 23A:
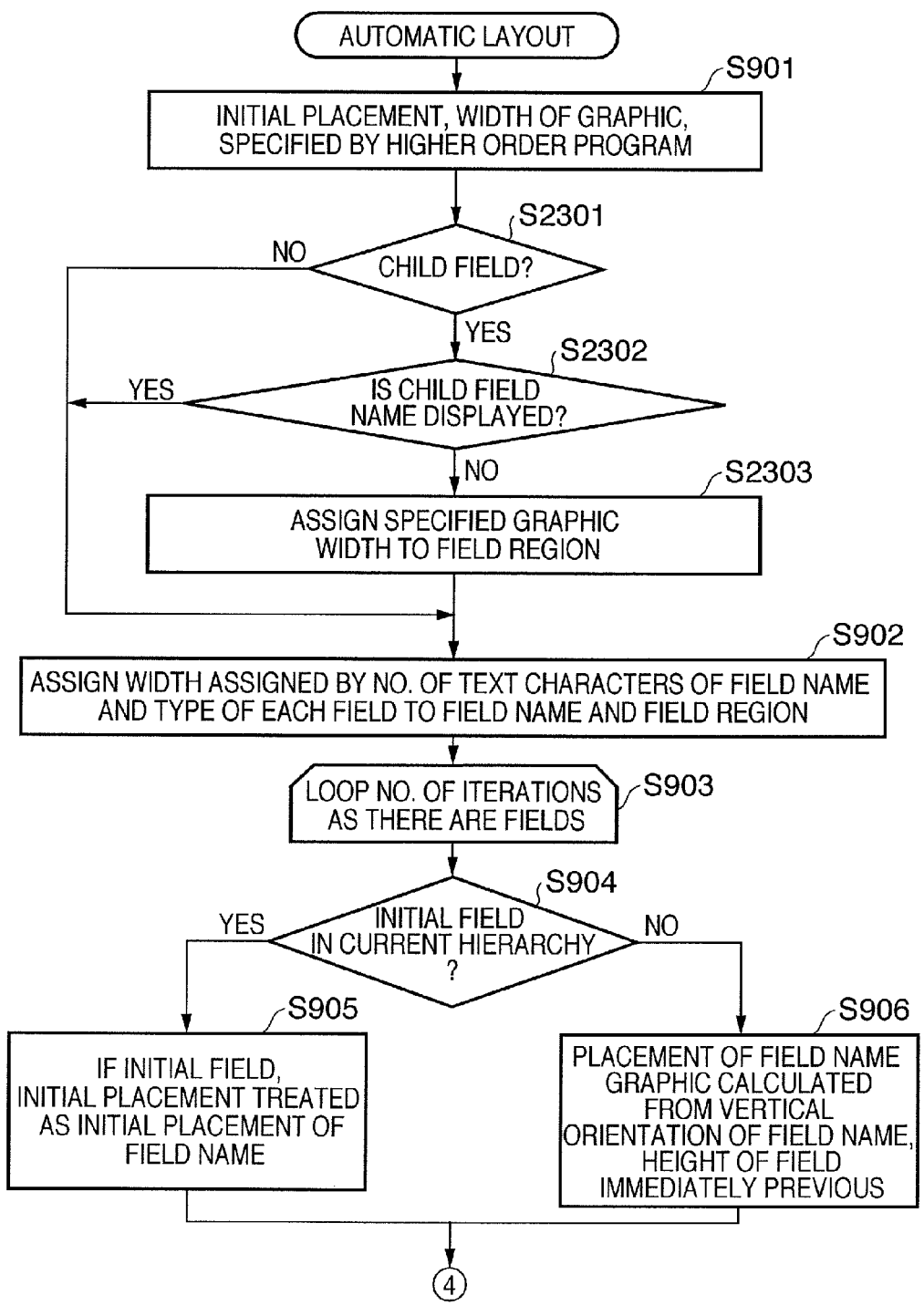
FIGS. 23A and 23B are flowcharts that is invoked when the child field name is not displayed.
Figure 23B:
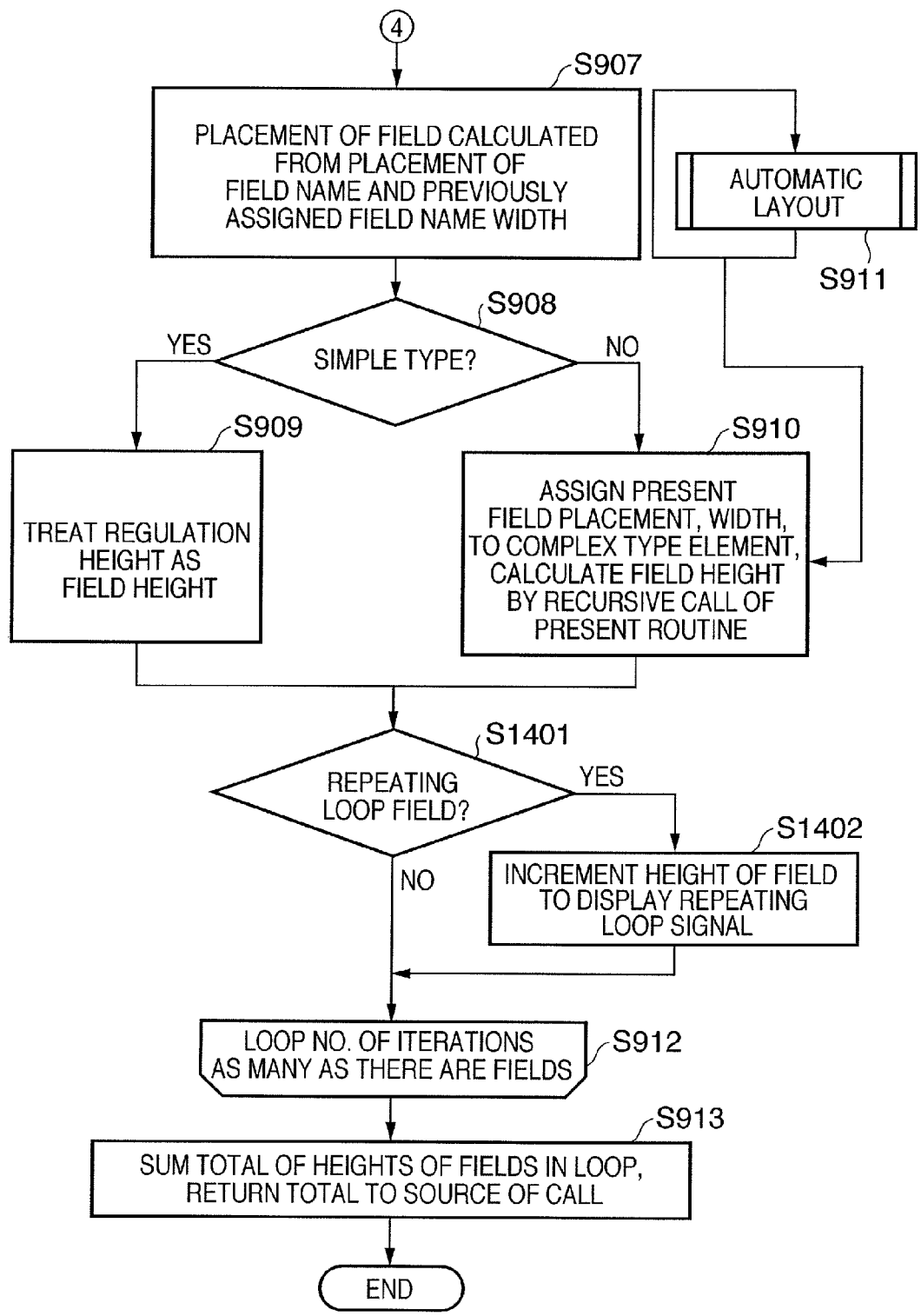

The steps in FIGS. 23A and 23B that correspond to the steps in FIGS. 14A and 14B are marked with identical reference numbers. Only the differences between FIGS. 14A and 14B and FIGS. 23A and 23B will be described hereinafter.

In step S2301, the field attributes are queried, and a determination is made as to whether or not the field is a child field. If the field is a child field, the display child field name flag is tested in step S2302. If the display child field name flag is unset, the entire specified graphic width is allocated to the field region in step S2303. The process jumps to S902 either after step S2303, or if either of the conditions is not met. Once the layout is set, the field name of the child field whose display child field name flag is not set is not displayed when the form display unit 504 displays the form. The same holds true for printing the form as well.

While each option is described separately from other options according to the embodiment, a field exists that, for example, may be both a child field and a parent field. If the display parent field name flag and the display child field name flag are set for such a field in a contradictory manner, it will be necessary to assign priority to one of the flags, and ignore the other, contradictory, setting.

Operation when Setting Arrangement Orientation to Horizontal

Figure 24:
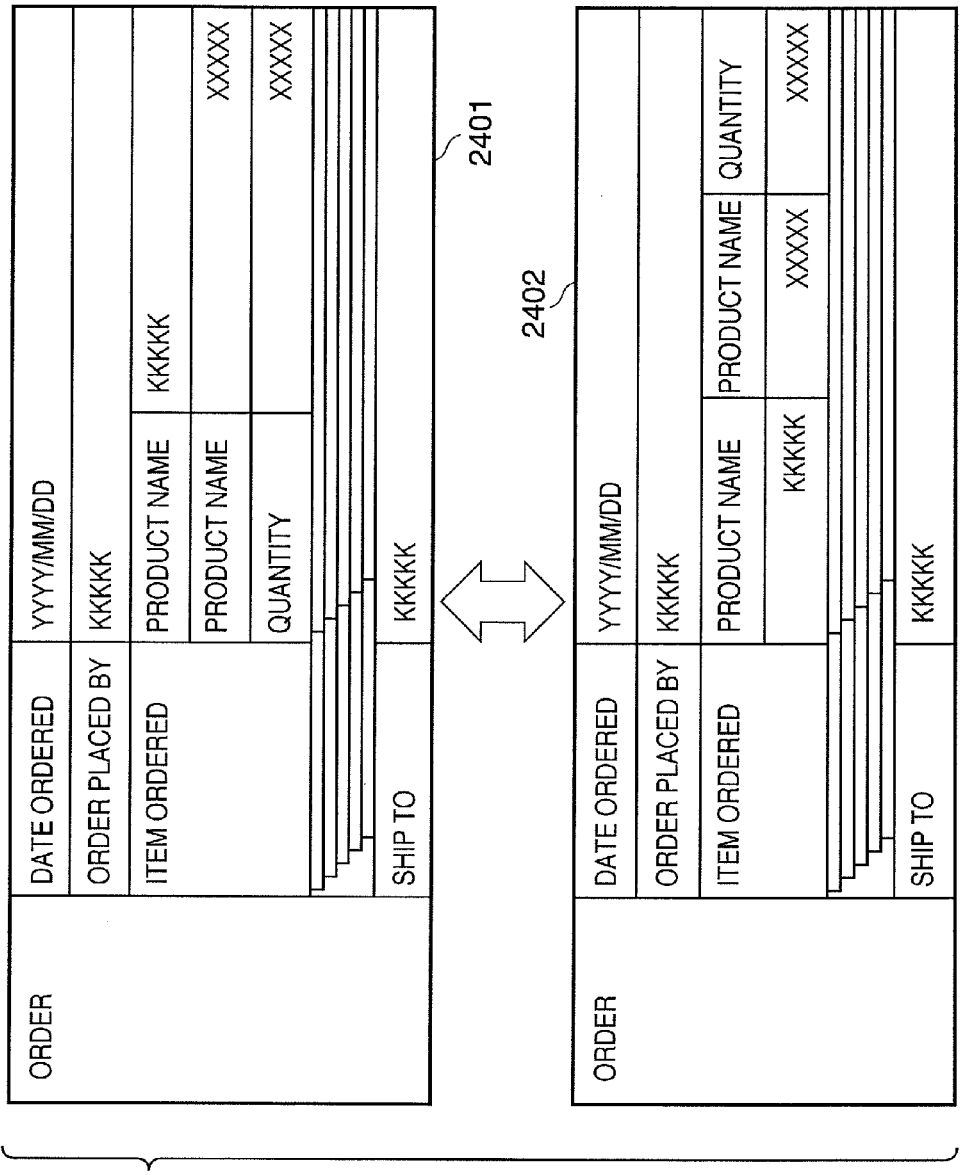
FIG. 24 is a layout that applies when making a lateral display selection.

The default setting is to unset the option. When the option is selected, the layout changes from a vertical arrangement 2401 to a horizontal arrangement 2402, such as the layout depicted in FIG. 24, which depicts an example of a horizontal arrangement of the child fields of the complexType field.

Figure 25:
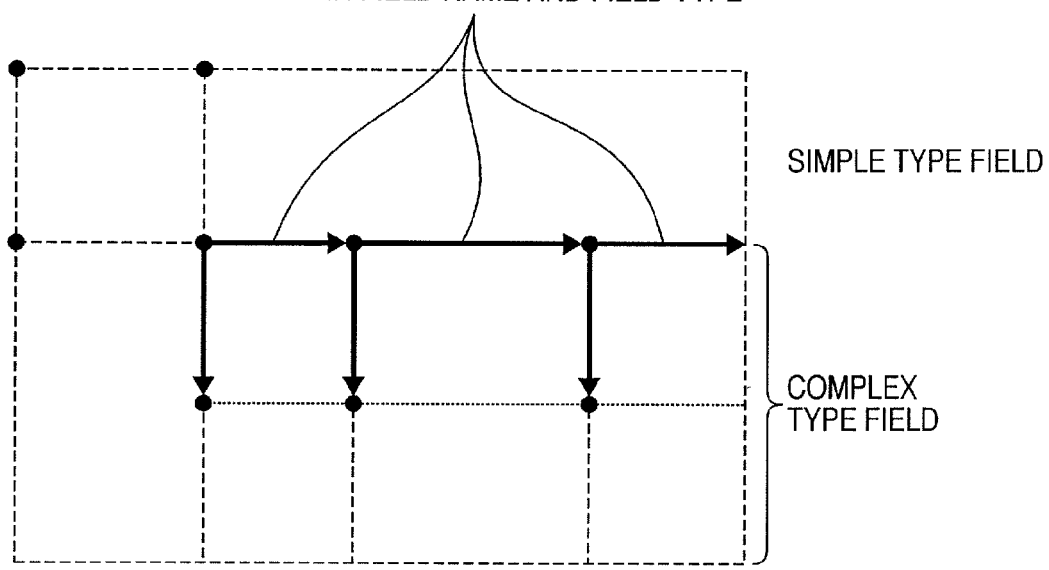
FIG. 25 is a conceptual illustration of a complex field layout calculation that is performed when the lateral display is in effect.

When the option is selected, the form edit program 1041 performs the partial automatic layout process. FIG. 25 depicts a conceptual illustration of the automatic layout process. The form edit program 1041 assigns to each respective field a width that is assigned based on the number of characters in the field name and the field region of each respective field that is within the same hierarchy as the hierarchy of the specified field. For example, the width that is specified by a higher order is partitioned into the number of fields in a single hierarchy, and a per field width is determined. The wider of the field name and the field region of each individual field is selected, and the value thereof is compared with the per field width thus determined. If the per field width thus determined is wider, the value thereof will be treated as the width of each respective field. If, on the other hand, the width that is determined on a per field basis is wider, the wider value for the field in question will be treated as the width thereof, and the width of the other fields reduced accordingly.

The placement of the name of each respective field is calculated as each field is individually shifted to the right. Summing the widths that are assigned to the initial placements determines the initial placements of each respective field in the width orientation. Each respective field is shifted downward from the field name by the regulated height, and the placement of the field region calculated. The regulated height is treated as the height of each respective field. The height of the field name and the height of the field region are summed, with the sum returned to the source of the call.

The process will alter the height of the complexType field, and if the height of the complexType field that is being edited is altered, the layout will be adjusted accordingly, by altering the initial placement of the succeeding fields.

Figure 26:
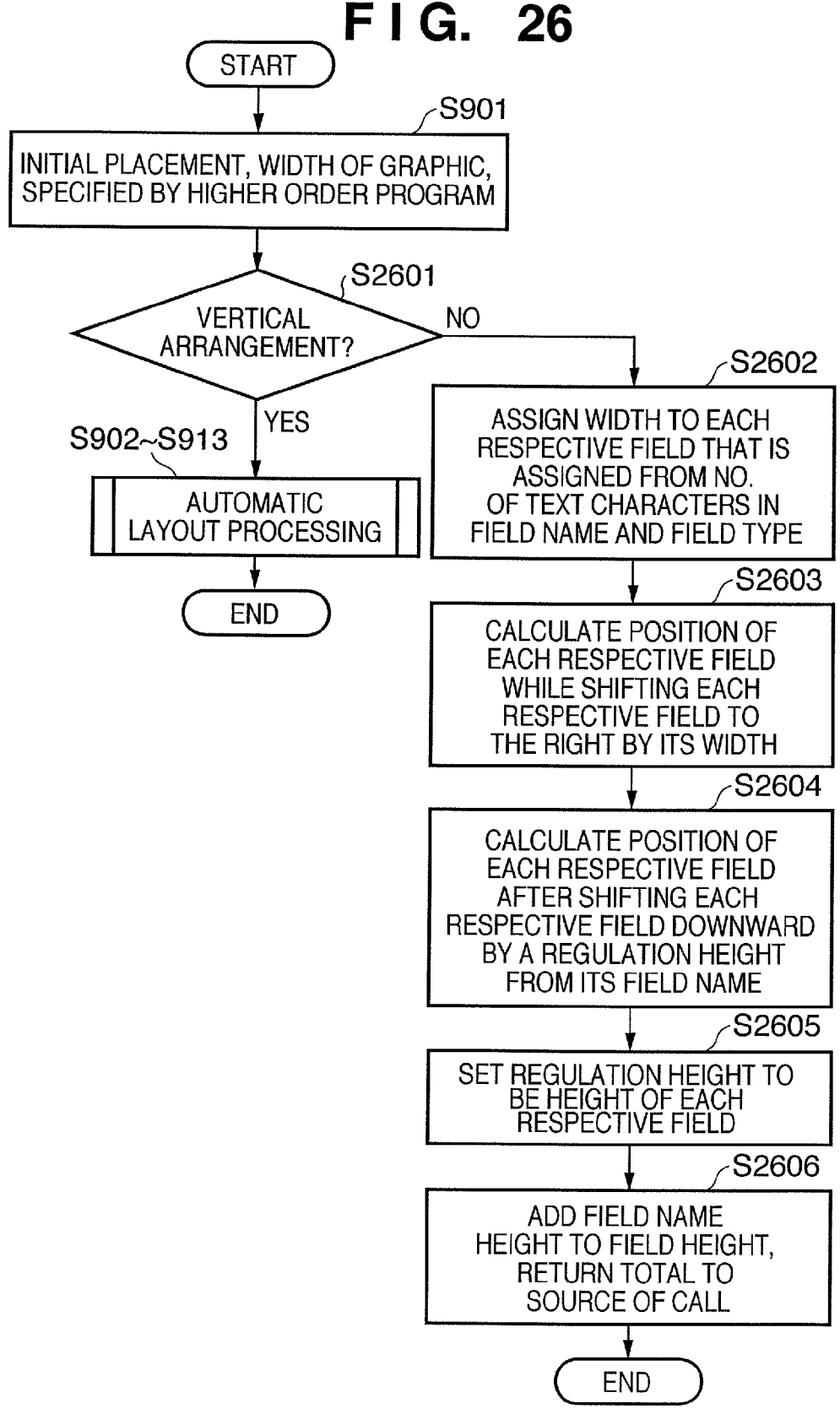
FIG. 26 is a flowchart that is invoked when the lateral display is in effect.

A flowchart that contains the foregoing function is depicted in FIG. 26. In step S2601, the flag is queried as to whether or not the fields are in the vertical arrangement. If the fields are in the vertical arrangement, the process in steps S902 through S913 is performed. If the fields are in the horizontal arrangement, the foregoing process is executed, in steps S2602 through S2606. No consideration is given in FIG. 26 to what happens when the field that is specified as being in the horizontal arrangement is a complexType field. To take such a circumstance into account, replace steps S2605 and S2606 with steps S908 and thereafter in FIGS. 14A and 14B immediately after step S2604. The sequence that is recursively called in step S911 is the sequence depicted in FIG. 26.

Operation when Setting "Display All Item Names"

The default setting is to unset the option. The layout of the form does not change during editing if the option is selected. The option applies when a plurality of items of data are entered in a repeating loop into the data elements, as part of merging the XML data into the form. FIG. 27 depicts an example of the merger of the XML data into the form with the option set. The field name, "item ordered", of the item ordered repeating loop field is only displayed once, rather than twice, as would match the number of iterations, and no line is displayed therebetween.

When the option is selected, the field names are internally given the "display all" attribute. When the repeating loop field with the "display all" attribute is found when the form data is generated by merging the form with the XML data, the field names for the second and successive iterations of the repeating loop are not displayed, and no line separating the field names is drawn.

Operation when Setting "Add Row Showing Totals of Given Sets of Values"

The "Add Row Showing Totals of Given Sets of Values" menu item is an instruction, not an option. Selecting the command adds a row below the repeating loop element that shows the total of the values therein.

Figure 28:
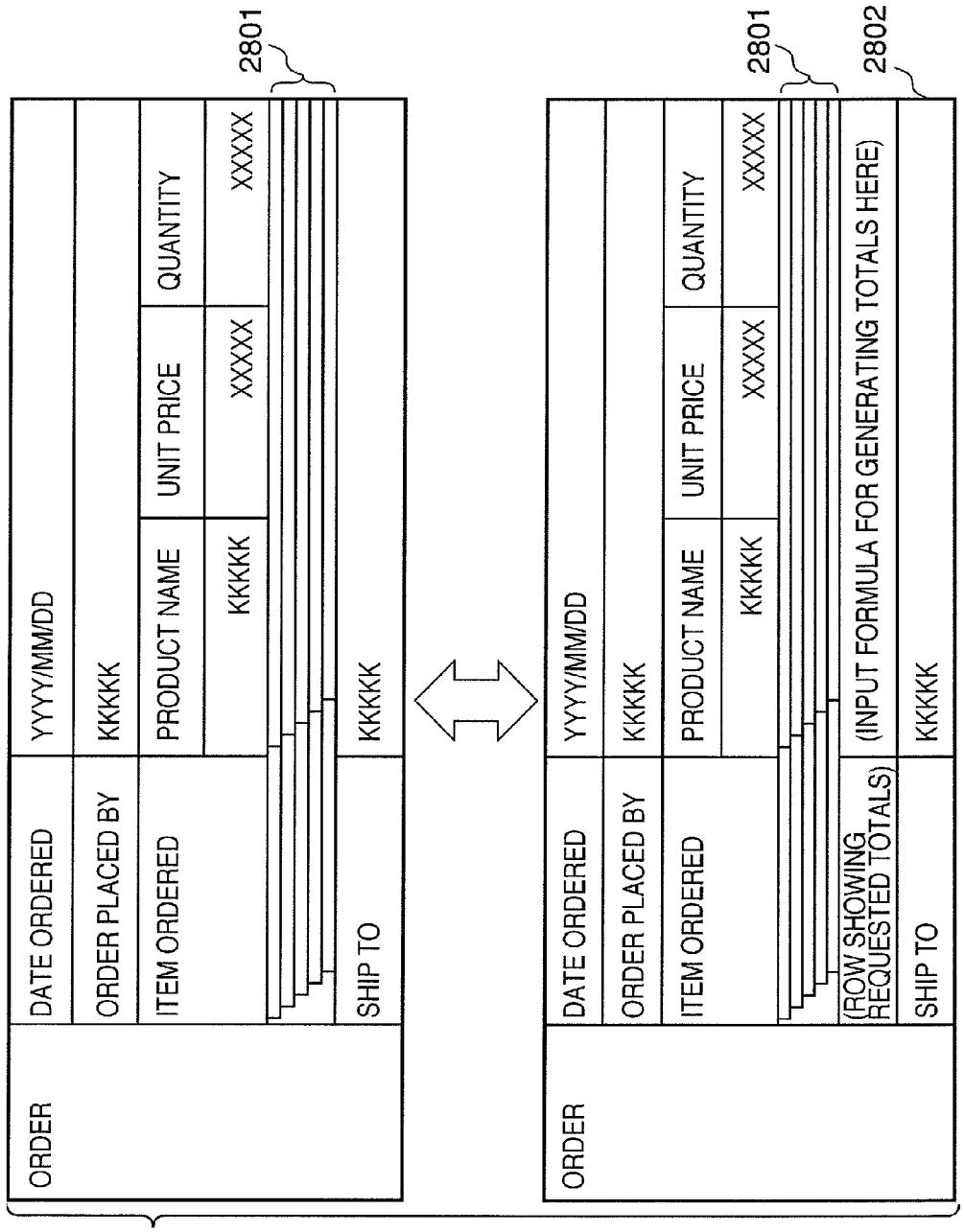
FIG. 28 is a layout that is invoked when a row is added that shows totals of the foregoing fields.

When the instruction is selected, the form edit program 1041 performs a partial automatic layout process on the form. The "Add Row Showing Totals of Given Sets of Values" attribute is set in the field attributes of the repeating loop field. The automatic layout routine positions the row that shows the total of the values, FIG. 28, reference numeral 2802, beneath the symbol that signifies the repeat in the repeating loop field, FIG. 28, reference numeral 2801, in accordance with the setting of the attribute. The row that shows the total of the values is formed from the name of the row that shows the total of the values and the field of the row that shows the total of the values, both of which are empty immediately upon the inclusion thereof. A message is thus displayed, upon the display of the row that shows the total of the values, that requests input thereto. A typical text string can be inputted into the name of the row that shows the total of the values. While a text string can be inputted into the field of the row that shows the total of the values, the text string that is inputted therein must be a formula, which is configured of a variable, which represents for example, a child element of the repeating data element, and a function, which performs a computation on one or more variables. The value of the formula when the XML data is merged with the form is determined, and the value thereof is displayed and printed.

Output

The output of the system according to the embodiment is a post-alteration field layout in accordance with the menu item that the user selects, or a setting of an attribute that takes effect during operation. The data structure information that is the source of the field attributes is maintained, and thus, it is possible to obtain the output with a smaller user operation than a typical graphics editor of a type similar to the editor according to the embodiment.

Thus, defining, in the XML schema, the data type of the field name and the field region of the form, as well as the sequence and the presence, or lack thereof, of a repeating loop, of a form, causes the allocation of appropriate width and height to each respective field name and field region, and the layout thereof. The placement and width thus laid out are saved on a per field basis, as the field attributes, for example. When displaying or printing out the form, the field attributes are queried, and the form is re-configured according to the placement and width recorded therein. Simply defining each respective field thus spares the operator the effort that would be otherwise involved with the layout. The layout of the form thus created reflects the arrangement of each respective field that is defined in the source XML schema, as well as the parent-child relationships therebetween, allowing immediate grasping of the content thereof.

Claim Correspondences

Following is a description of correspondences with the steps that are recited at the start of the detailed description of the invention, as well as the configurations thereof.

The "structured description data that describes a table's configuration based on the sequence and the hierarchy of a plurality of table elements" corresponds to data that denotes the structure of the table, which is described in, for example, the XML schema. FIG. 3 depicts an example thereof.

"Determining the placement and size of each respective element according to the sequence and the hierarchy, and thus creating the layout of the table" corresponds to the work performed by the form system, and in particular the automatic table field generator 502 and the automatic table field layout unit 503.

The "structured data storage unit that stores the structured description data that describes the table's configuration based on the sequence and the hierarchy of each of a plurality of table elements" corresponds to the form storage units 103 and 203.

The "layout determination unit that determines the position and the size of each respective table element according to the sequence and the hierarchy of the plurality of table elements, in accordance with the structured description data" corresponds to the automatic table field generator 502 and the automatic table field layout unit 503.

The "layout storage unit that stores the position and the size of each respective table element that is determined by the layout determination unit" corresponds to the form system, and in particular the automatic table field generator 502 and the automatic table field layout unit 503. The storage location corresponds to form storage units 103 and 203.

A "layout alteration unit that alters either or both of the position or size of the table elements that are determined with the layout determination unit" corresponds to the table field selection editor 505 and the automatic table field layout unit 503.

Other Embodiments

A form is generated from data that is described in the XML schema, according to the embodiment. It would also be possible to generate the form based on a language or coding method other than the XML schema, if the language or coding method describes the configuration of the form. Such a description will be referred to as the structured description of the form, and the data, the structured description data. The XML schema is one method of structured description, and the structure of the form that is described thereby is the structured description data.

It is also possible to apply the invention to a form that replaces a table with a more typical format.

While the options depicted according to the second embodiment are described in the flowcharts as individual functions, it is also possible to postulate a system that combines all of the options. If a contradictory setting occurs, all that needs to be done is to predetermine which setting takes priority in such a circumstance.

According to the embodiment, the user is able to alter, with ease, form elements that change frequently, such as whether or not the field name is outputted and the orientation thereof, whether or not the Row Showing Totals of Given Sets of Values is present, and the collation of the repeating loop items. The usability is thus further enhanced, as is productivity in editing. The degrees of freedom of the form may also be increased.

It would be permissible to apply the present invention to either a system that is configured of a plurality of devices, such as, for example, a host computer, an interface device, a reader, and a printer, or an apparatus that is configured of a single device, such as, for example, a multifunction peripheral or a fax machine. The objective of the present invention is also achieved by supplying a recording medium, whereupon is stored a program code that implements the functions of the embodiments, to the system or the apparatus, and having the computer of the system or the apparatus load and execute the program code that is stored on the recording medium. In such a circumstance, the program code itself that is loaded from the recording medium implements the functions of the embodiments, and thus, the program code itself and the recording medium that stores the program code configure the present invention.

The present invention also includes a circumstance wherein the functions of the embodiments are implemented by a process that is actually performed, in whole or in part, by an operating system or other software that is running on the computer, in accordance with the directions of the program code. The present invention is also applied when the program code that is loaded from the recording medium is written to a memory that is on an expansion card that is inserted into the computer, or in an expansion unit that is connected to the computer. In such a circumstance, the functions of the embodiments are implemented by a process that is actually performed, in whole or in part, by a CPU or other hardware that is on the expansion card or in the expansion unit, in accordance with the directions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-229853, filed Aug. 25, 2006, which is hereby incorporated by reference herein in its entirety.

What is claimed is:

1. A table editing apparatus, comprising:
   a structured data storage unit adapted to storing a structured description data that describes a table's configuration based on a sequence and a hierarchy of a plurality of table elements;
   a layout determination unit adapted to determining a position and a graphical size of each respective table element according to the sequence and the hierarchy of the plurality of table elements, in accordance with the structured description data; and
   a layout storage unit adapted to storing the position and the graphical size of each respective table element that is determined by the layout determination unit;
   the layout determination unit further adapted to determining the graphical size of certain respective table elements from the plurality of table elements by determining an initial graphical size of each of the certain table elements, and then calculating graphical sizes of portions of each of the certain table elements based on the initial graphical size and a graphical size of a field name related to the certain table elements.

2. The table editing apparatus according to claim 1, wherein:
   the configuration of the table that is described by the structured description data further describes that a table element is displayed in a repeating loop; and
   the layout determination unit inserts an element into the table that signifies that a repeating loop table element is repeating, and determines the position and the graphical size thereof.

3. The table editing apparatus according to claim 2, wherein:
   the table element includes the field name, which denotes a name of an item within the table, and a field region, into which a content of the item is inserted; and
   the layout determination unit determines the position and the graphical size of the plurality of table elements, such that a child table element that is associated with a parent table element of a hierarchy of the plurality of table elements is laid out within the field region of the parent table element of the hierarchy.

4. The table editing apparatus according to claim 2, wherein:
   the layout alteration unit adds a table element that denotes a total value of the repeating loop table element, and determines the position and the graphical size thereof, in response to the user instruction.

5. The table editing apparatus according to claim 3, further comprising:
   a layout alteration unit adapted to altering either or both of the position or size of the table elements that are determined with the layout determination unit, in response to a user instruction.

6. The table editing apparatus according to claim 3, wherein:
the layout alteration unit alters the position and the graphical size of the table element such that a field name of a repeating loop table element is collated into a single field name, in response to the user instruction.

7. The table editing apparatus according to claim 5, wherein:
the layout alteration unit performs an alteration that deletes the field name of either the parent table element or the child table element, in response to the user instruction.

8. The table editing apparatus according to claim 1, wherein:
the layout determination unit determines the position and the graphical size of a plurality of table elements of a common hierarchy, such that the plurality of table elements is arranged in an orientation of the height of the table; and
the layout alteration unit alters the position and the graphical size of the plurality of table elements of the common hierarchy, such that the plurality of table elements is arranged in an orientation of the width of the table, in response to the user instruction.

9. A non-transitory computer-readable storage medium storing a program that, when executed by a computer, causes the computer to function as:
a structured data storage unit adapted to storing a structured description data that describes a table's configuration based on a sequence and a hierarchy of a plurality of table elements;
a layout determination unit adapted to determining a position and a graphical size of each respective table element according to the sequence and the hierarchy of the plurality of table elements, in accordance with the structured description data; and
a layout storage unit adapted to storing the position and the graphical size of each respective table element that is determined by the layout determination unit;
the layout determination unit further adapted to determining the graphical size of certain respective table elements by determining an initial graphical size of each of the certain table elements, and then calculating graphical sizes of portions of each of the certain table elements based on the initial graphical size and a graphical size of a field name related to the certain table elements.

10. The non-transitory computer-readable storage medium according to claim 9, wherein:
the configuration of the table that is described by the structured description data further describes that a table element is displayed in a repeating loop; and
the layout determination unit inserts an element into the table that signifies that a repeating loop table element is repeating, and determines the position and the graphical size thereof.

11. The non-transitory computer-readable storage medium according to claim 10, wherein:
the table element includes a field name, which denotes a name of an item within the table, and a field region, into which a content of the item is inserted; and
the layout determination unit determines the position and the graphical size of the plurality of table elements, such that a child table element that is associated with a parent table element of a hierarchy of the plurality of table elements is laid out within the field region of the parent table element of the hierarchy.

12. The non-transitory computer-readable storage medium according to claim 10, wherein:
the layout alteration unit adds a table element that denotes a total value of the repeating loop table element, and determines the position and the graphical size thereof, in response to the user instruction.

13. The non-transitory computer-readable storage medium according to claim 11, further comprising:
a layout alteration unit adapted to altering either or both of the position or size of the table elements that are determined with the layout determination unit, in response to a user instruction.

14. The non-transitory computer-readable storage medium according to claim 11, wherein:
the layout alteration unit alters the position and the graphical size of the table element such that a field name of a repeating loop table element is collated into a single field name, in response to the user instruction.

15. The non-transitory computer-readable storage medium according to claim 13, wherein:
the layout alteration unit performs an alteration that deletes the field name of either the parent table element or the child table element, in response to the user instruction.

16. The non-transitory computer-readable storage medium according to claim 9, wherein:
the layout determination unit determines the position and the graphical size of a plurality of table elements of a common hierarchy, such that the plurality of table elements is arranged in an orientation of the height of the table; and
the layout alteration unit alters the position and the graphical size of the plurality of table elements of the common hierarchy, such that the plurality of table elements is arranged in an orientation of the width of the table, in response to the user instruction.

17. A table editing method, comprising the steps of:
determining a position and a graphical size each of a plurality of table elements according to a sequence and a hierarchy of the plurality of table elements, in accordance with structured description data that describes a structure of the table by way of the sequence and the hierarchy of the plurality of table elements, and that is stored in a layout storage unit; and
storing the position and the graphical size of each respective table element that is determined by the determination step;
the determining step further including determining the graphical size of certain respective table elements by determining an initial graphical size of each of the certain table elements, and then calculating graphical sizes of portions of each of the certain table elements based on the initial graphical size and a graphical size of a field name related to the certain table elements.

18. The method according to claim 17, wherein:
a configuration of the table that is described by the structured description data further describes that a table element from the plurality of table elements is displayed in a repeating loop; and
an element is inserted in the determining step into the table that signifies that a repeating loop table element is repeating, and determines the position and the graphical size thereof.

19. The method according to claim 18, wherein:
the table element includes the field name, which denotes a name of an item within the table, and a field region, into which a content of the item is inserted; and
the position and the graphical size of the plurality of table elements is determined in the determining step, such that a child table element that is associated with a parent table element of a hierarchy of the plurality of table elements is laid out within the field region of the parent table element of the hierarchy.

20. The method according to claim 18, wherein:
in the layout alteration step, a table element that denotes a total value of the repeating loop table element is added, and the position and the graphical size thereof is determined, in response to the user instruction.

21. The method according to claim 19, further comprising:
a layout alteration step of altering either or both of the position or size of the table elements that are determined with a layout determination unit, in response to a user instruction.

22. The method according to claim 19, wherein:
the position and the graphical size of the table element is alerted in the layout alteration step such that a field name of a repeating loop table element is collated into a single field name, in response to the user instruction.

23. The method according to claim 21, wherein:
an alteration that deletes the field name of either the parent table element or the child table element is performed in the layout alteration step, in response to the user instruction.

24. The method according to claim 17, wherein:
the position and the size of a plurality of table elements of a common hierarchy is determined in the determining step, such that the plurality of table elements is arranged in an orientation of the height of the table; and
the position and the graphical size of the plurality of table elements of the common hierarchy is alerted in the layout alteration step, such that the plurality of table elements is arranged in an orientation of the width of the table, in response to the user instruction.

* * * * *